United States Patent
Kvache et al.

(10) Patent No.: US 9,225,798 B2
(45) Date of Patent: Dec. 29, 2015

(54) REMOTE ACCESS TO A CUSTOMER HOME NETWORK

(71) Applicant: VERIZON PATENT AND LICENSING INC., Basking Ridge, NJ (US)

(72) Inventors: Alexander Kvache, Brookline, MA (US); Vincent Phuah, Waltham, MA (US); Lujun Jia, Foxboro, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/158,379

(22) Filed: Jan. 17, 2014

(65) Prior Publication Data

US 2014/0136623 A1   May 15, 2014

Related U.S. Application Data

(62) Division of application No. 11/865,319, filed on Oct. 1, 2007, now Pat. No. 8,635,300.

(51) Int. Cl.
| | |
|---|---|
| *H04L 29/06* | (2006.01) |
| *H04L 12/28* | (2006.01) |
| *H04W 84/10* | (2009.01) |
| *H04L 29/08* | (2006.01) |

(52) U.S. Cl.
CPC ............ *H04L 67/40* (2013.01); *H04L 12/2809* (2013.01); *H04L 12/2812* (2013.01); *H04L 12/2825* (2013.01); *H04L 65/1006* (2013.01); *H04L 65/1026* (2013.01); *H04L 65/1063* (2013.01); *H04L 65/1069* (2013.01); *H04L 65/1073* (2013.01); *H04L 65/40* (2013.01); *H04W 84/105* (2013.01); *H04L 67/30* (2013.01)

(58) Field of Classification Search
CPC ................. H04L 65/1063; H04L 65/1069
See application file for complete search history.

(56) References Cited

U.S. PATENT DOCUMENTS

| | | | |
|---|---|---|---|
| 7,263,102 B2 | 8/2007 | Kreiner et al. | |
| 7,522,904 B1 | 4/2009 | Zhu | |
| 7,787,443 B2 * | 8/2010 | Varney et al. | 370/352 |
| 7,822,406 B2 | 10/2010 | Lee et al. | |
| 7,975,058 B2 | 7/2011 | Okmianski et al. | |
| 2006/0155851 A1 * | 7/2006 | Ma et al. | 709/226 |
| 2006/0209857 A1 | 9/2006 | Hicks, III | |
| 2007/0022469 A1 | 1/2007 | Cooper et al. | |
| 2007/0105589 A1 * | 5/2007 | Lu | 455/556.2 |
| 2008/0212495 A1 * | 9/2008 | Stirbu | 370/254 |
| 2010/0217837 A1 * | 8/2010 | Ansari et al. | 709/218 |
| 2011/0191483 A1 * | 8/2011 | Zhu | 709/228 |

OTHER PUBLICATIONS

Bernstein, et al., "CPE WAN Management Protocol", DSL Forum TR-069, p.p. 1-109, May 1, 2004.
Bernstein, 2 Wire Tim Spets, Westell, May 2004, DSL Forum TR-069.

* cited by examiner

*Primary Examiner* — Asghar Bilgrami

(57) ABSTRACT

A wireless application server may receive, from a wireless device, information identifying an application residing on a network device in a home network. The wireless application server may further cause a connection to be established to the application and transfer traffic between the application and the wireless device.

20 Claims, 19 Drawing Sheets

| APP NAME 410 | APP ID 420 | IP CORE PROTOCOL 430 | PORT NO 440 | TRANSPORT PROTOCOL 450 | ADDITIONAL INFO 460 |
|---|---|---|---|---|---|
| WEB CAM | 123456 | TCP | 1 | HTTP | VERSION 1.2 |
| APP NAME | APP ID | PROTOCOL | PORT NO | PROTOCOL | ADDITIONAL INFORMATION |
| APP NAME | APP ID | PROTOCOL | PORT NO | PROTOCOL | ADDITIONAL INFORMATION |
| APP NAME | APP ID | PROTOCOL | PORT NO | PROTOCOL | ADDITIONAL INFORMATION |
| ... | | | | | |
| APP NAME | APP ID | PROTOCOL | PORT NO | PROTOCOL | ADDITIONAL INFORMATION |

FIG. 4

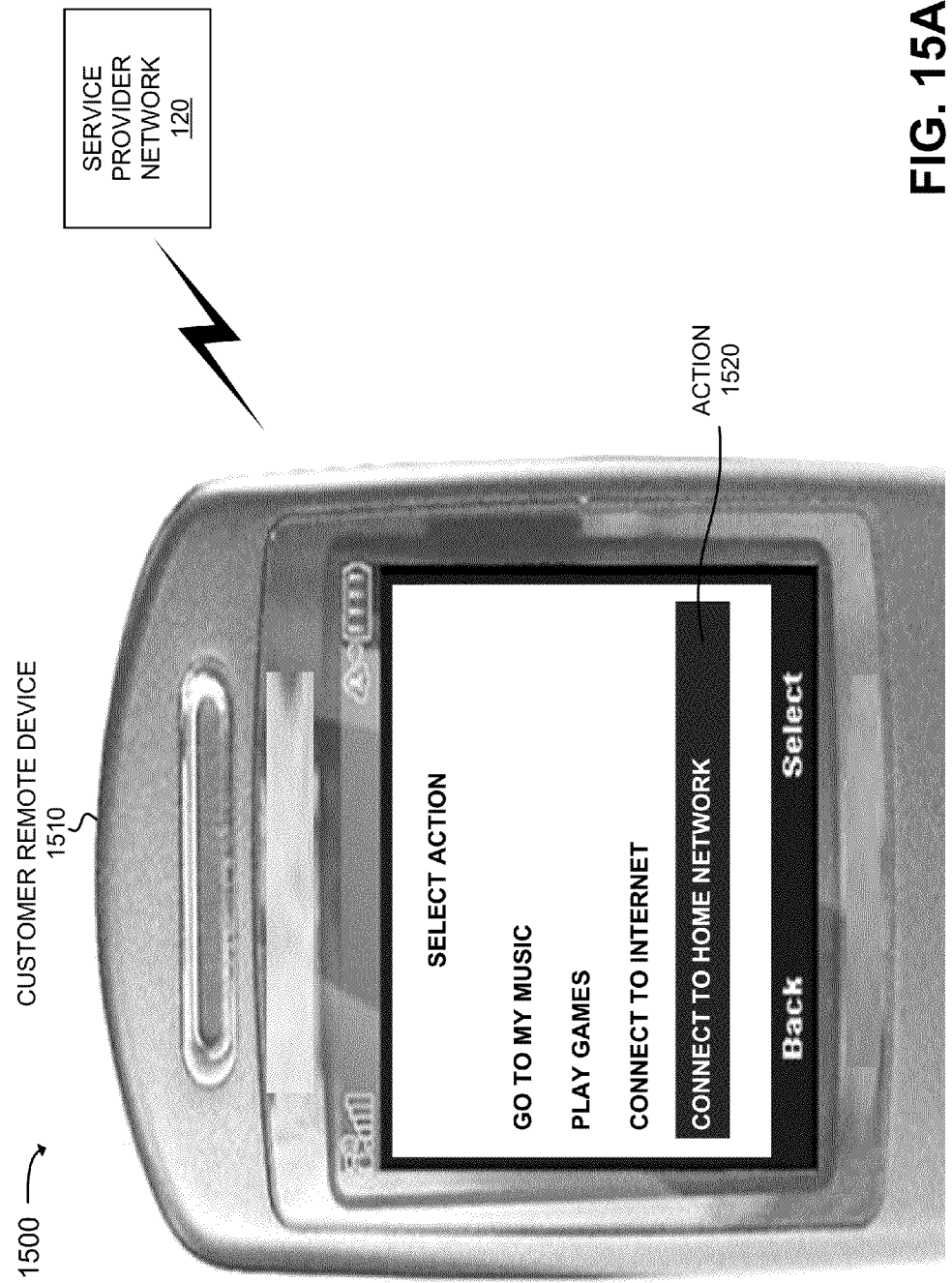

REMOTE ACCESS TO A CUSTOMER HOME NETWORK

RELATED APPLICATION

This application is a divisional of U.S. patent application Ser. No. 11/865,319, filed Oct. 1, 2007 (now U.S. Pat. No. 8,635,300), the content of which is incorporated herein by reference in its entirety.

BACKGROUND INFORMATION

With the advent of hardware and software capabilities of mobile phones and the increasing availability of residential broadband Internet service, customers are demanding services that operate seamlessly on both broadband and cellular networks. A typical broadband home network includes a router and one or more personal computers. The broadband home network may also include other types of network devices, such as set-top boxes, Network Attached Storage (NAS) devices, web cameras, etc. A typical router may implement Network Address Translation (NAT) and may include a built-in firewall and a Dynamic Host Configuration Protocol (DHCP) server. The router may connect to the Internet with a single dynamic public Internet Protocol (IP) address. Home network devices may use the router's DHCP assigned private addresses. Thus, the home network devices are typically not directly accessible from the Internet.

BRIEF DESCRIPTION OF THE DRAWINGS

FIG. 4 is an exemplary diagram of a portion of the application database of FIG. 1 according to one exemplary embodiment;

FIGS. 15A-15E illustrate an example of the processing described with respect to FIG. 10.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Figure 1:
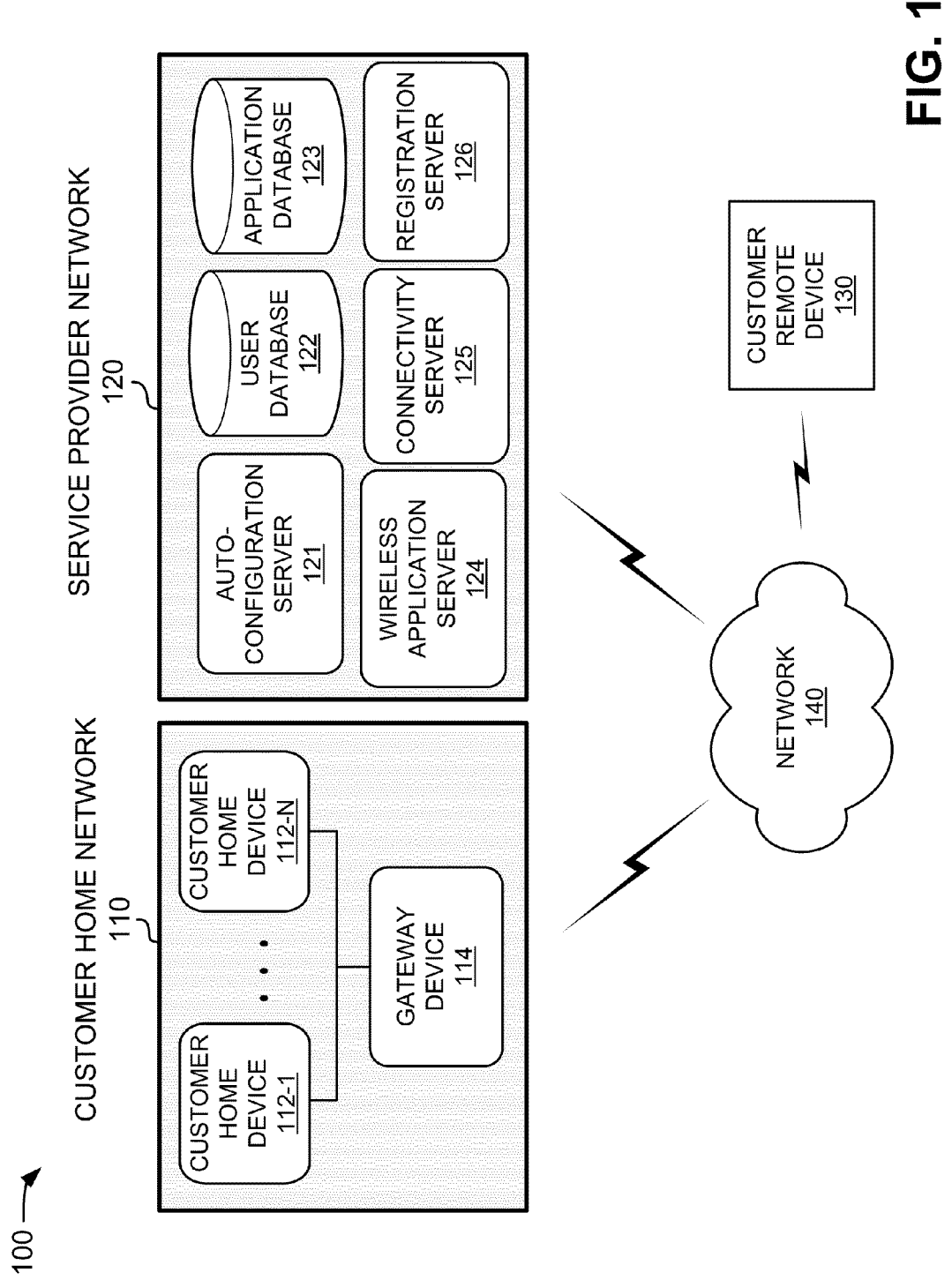
FIG. 1 is an exemplary network in which systems and methods, consistent with exemplary embodiments, may be implemented.

FIG. 1 is an exemplary network in which systems and methods, consistent with exemplary embodiments, may be implemented. As illustrated, network 100 may include a customer home network 110, a service provider network 120, and a customer remote device 130 that connect via a network 140. The number of customer home networks 110, service provider networks 120, customer remote devices 130, and networks 140 illustrated in FIG. 1 is provided for simplicity. In practice, there may be more or fewer customer home networks 110, service provider networks 120, customer remote devices 130, and/or networks 140.

Customer home network 110 may include one or more devices that make up a customer's home (or residential) wired and/or wireless network. As illustrated, customer home network 110 may include a group of customer home devices 112-1 through 112-N (referred to collectively as "customer home devices 112") and a gateway device 114. The number of customer home devices 112 and gateway devices 114 illustrated in FIG. 1 is provided for simplicity. In practice, there may be more or fewer customer home devices 112 and/or gateway devices 114.

Customer home devices 112 may include one or more entities capable of transmitting and/or receiving traffic via a network. An entity may be defined as a device, such as a computer or another type of computation or communication device, a thread or process running on one of these devices, and/or an object executable by one of these devices. In one embodiment, customer home devices 112 may include a personal computer, a laptop, a storage device, a set-top box, a web camera, a gaming system, a Voice over Internet Protocol (VoIP) device, and/or another type of device that may receive and/or transmit traffic.

Customer home devices 112 may store one or more applications that are accessible to the customer via customer remote device 130. An application may be broadly defined as any application residing on a customer home device 112-1 through 112-N that may be accessible to another device via a network. The application may listen on one or more ports of gateway device 114. Each customer device 112-1 through 112-N may host one or more applications. Examples of applications may include the Microsoft File Sharing (Common Internet File System (CIFS)/Server Message Block (SMB)) application, a File Transfer Protocol (FTP) server application, a Hypertext Transfer Protocol (HTTP) server application, etc. A customer home device 112-1 through 112-N may connect to another customer home device 112-1 through 112-N and to gateway device 114 via a wired and/or wireless connection.

Gateway device 114 may include one or more devices capable of routing traffic between customer home devices 112 and network 140. For example, gateway device 114 may include a gateway, a bridge, a router (e.g., a broadband router), etc. In one embodiment, gateway device 114 may include a TR-069-compliant home router, as specified in Jeff Bernstein et al., "CPE WAN Management Protocol," DSL Forum TR-069, May 2004, pp. 1-109, which is incorporated by reference herein. Gateway device 114 may implement a Universal Plug and Play (UPnP) control point. Customer home network 110 may connect to network 140 via wired and/or wireless connections.

Service provider network 120 may include one or more devices that aid in transferring data between customer home devices 112 of customer home network 110 and customer remote device 130. As illustrated, service provider network 120 may include an auto-configuration server 121, a user database 122, an application database 123, a wireless application server 124, a connectivity server 125, and a registration server 126. The number of auto-configuration servers 121, user databases 122, application databases 123, wireless application servers 124, connectivity servers 125, and registration servers 126 illustrated in FIG. 1 is provided for simplicity. In practice, there may be more auto-configuration servers 121, user databases 122, application databases 123, wireless application servers 124, connectivity servers 125, and/or registration servers 126.

Auto-configuration server 121 may include one or more devices capable of configuring customer home devices 112 and/or gateway device 114 for transmitting traffic to and/or receiving traffic from customer remote device 130. Auto-configuration server 121 may interact with customer home network 110 to obtain information (e.g., operational status, configuration, etc.) of customer home network 110. In one embodiment, auto-configuration server 121 may implement a Southbound Application Interface to gateway device 114 and one or more Northbound Application Interfaces to other components of service provider network 120 (e.g., connectivity server 125), according to the TR-069 protocol.

User database 122 may include one or more databases that store information about registered users and their home networks. For example, user database 122 may store information relating to customer home devices 112 and gateway device 114 in customer home network 110 and information relating to the customer associated with customer home network 110.

Application database 123 may include one or more databases that store information associated with applications that reside on customer home devices 112. For example, the information may include information identifying the applications, information relating to operation of the applications, etc.

Wireless application server 124 may include one or more devices that act as an entry point for customer remote device 130 to access an application on a customer home device 112-1 through 112-N. In one embodiment, wireless application server 124 may host applications and protocol engines that provide data conversion and protocol translation, respectively, for traffic traveling between customer remote device 130, customer home devices 112, and/or other components of service provider network 120.

Connectivity server 125 may include one or more devices that provide a connection between service provider network 120 and customer home network 110. In one embodiment, connectivity server 125 may establish a secure connection between wireless access server 124 and customer home network 110 via auto-configuration server 121. Connectivity server 125 may implement a TR-069 Northbound Application Interface.

Registration server 126 may include one or more devices that register a customer and information relating to the applications that are installed on the customer's home devices 112. Registration server 126 may store information relating to the customer and the applications in user database 122.

Service provider network 120 may connect to network 140 via wired and/or wireless connections.

Customer remote device 130 may include one or more computation or communication devices, a thread or process running on one of these devices, and/or an object executable by one of these devices. In one embodiment, customer remote device 130 may include any type of handheld device capable of running a downloadable binary execution module and establishing a connection to a network, such network 140. For example, customer remote device 130 may include a mobile phone, a personal digital assistant (PDA), a Blackberry device, a notebook or laptop computer, etc. Customer remote device 130 may connect to network 130 via a wired or wireless connection.

Network 140 may include one or more networks of any type, including a Public Land Mobile Network (PLMN), a local area network (LAN), a metropolitan area network (MAN), a wide area network (WAN), an Internet Protocol Multimedia Subsystem (IMS) network, a private network, the Internet, an intranet, and/or another type of network.

In one embodiment, a component of network 100 may perform one or more of the tasks described below as performed by another component of network 100.

Figure 2:
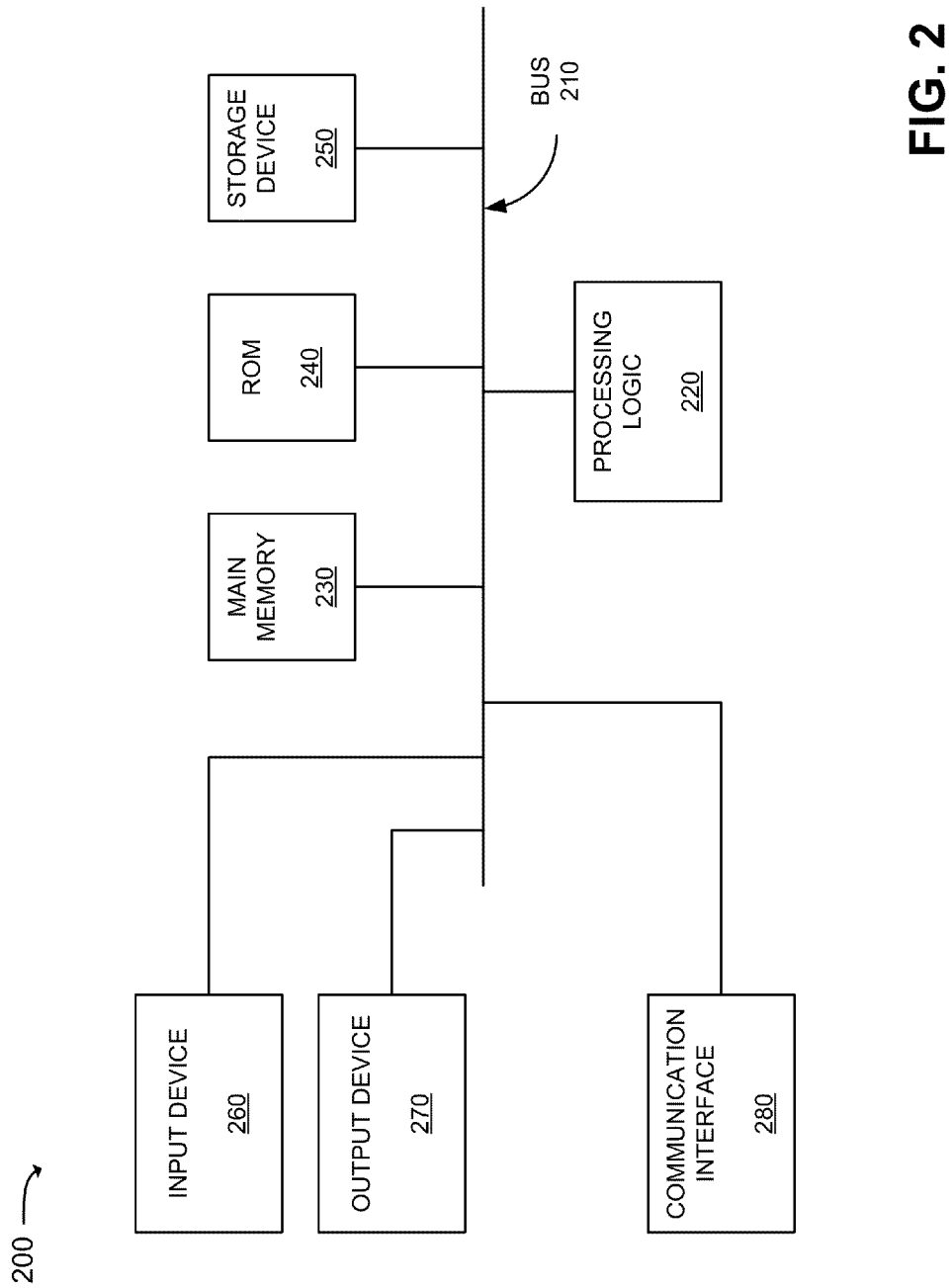
FIG. 2 is an exemplary block diagram of a device according to an exemplary embodiment.

FIG. 2 is an exemplary block diagram of a device 200 according to an exemplary embodiment. Device 200 may correspond to a customer home device 112-1 through 112-N, gateway device 114, auto-configuration server 121, wireless application server 124, connectivity server 125, and/or registration server 126. As illustrated, device 200 may include a bus 210, processing logic 220, a memory 230, a read only memory (ROM) 240, a storage device 250, an input device 260, an output device 270, and a communications interface 280.

Bus 210 may permit communication among the components of device 200. Processing logic 220 may include any type of processor or microprocessor that interprets and executes instructions. In other embodiments, processing logic 220 may be implemented as or include an Application Specific Integrated Circuit (ASIC), a Field Programmable Gate Array (FPGA), or the like. Memory 230 may include a Random Access Memory (RAM) or another type of dynamic storage device that stores information and instructions for execution by processing logic 220. ROM 240 may include a ROM device and/or another type of static storage device that stores static information and instructions for processing logic 220. Storage device 250 may include some other type of magnetic or optical recording medium and its corresponding drive for storing information and/or instructions.

Input device 260 may include a device that permits an operator to input information to device 200, such as a keyboard, a keypad, a mouse, a pen, a microphone, one or more biometric mechanisms, and the like. Output device 270 may include a device that outputs information to the operator, including a display, a printer, a speaker, etc.

Communication interface 280 may include any transceiver-like mechanism that enables device 200 to communicate with other devices and/or systems. For example, communication interface 280 may include mechanisms for communicating with another device or system via a network, such as network 140.

Device 200 may perform certain operations as described in detail below. Device 200 may perform these and other operations in response to processing logic 220 executing software instructions contained in a computer-readable medium, such as memory 230. A computer-readable medium may be defined as a physical or logical memory device. The software instructions may be read into memory 230 from another computer-readable medium, such as data storage device 250, or from another device via communication interface 280. The software instructions contained in memory 230 may cause processing logic 220 to perform operations that will be described later. Alternatively, hardwired circuitry may be used in place of or in combination with software instructions to implement processes consistent with exemplary embodiments. Thus, systems and methods described herein are not limited to any specific combination of hardware circuitry and software.

Figure 3:
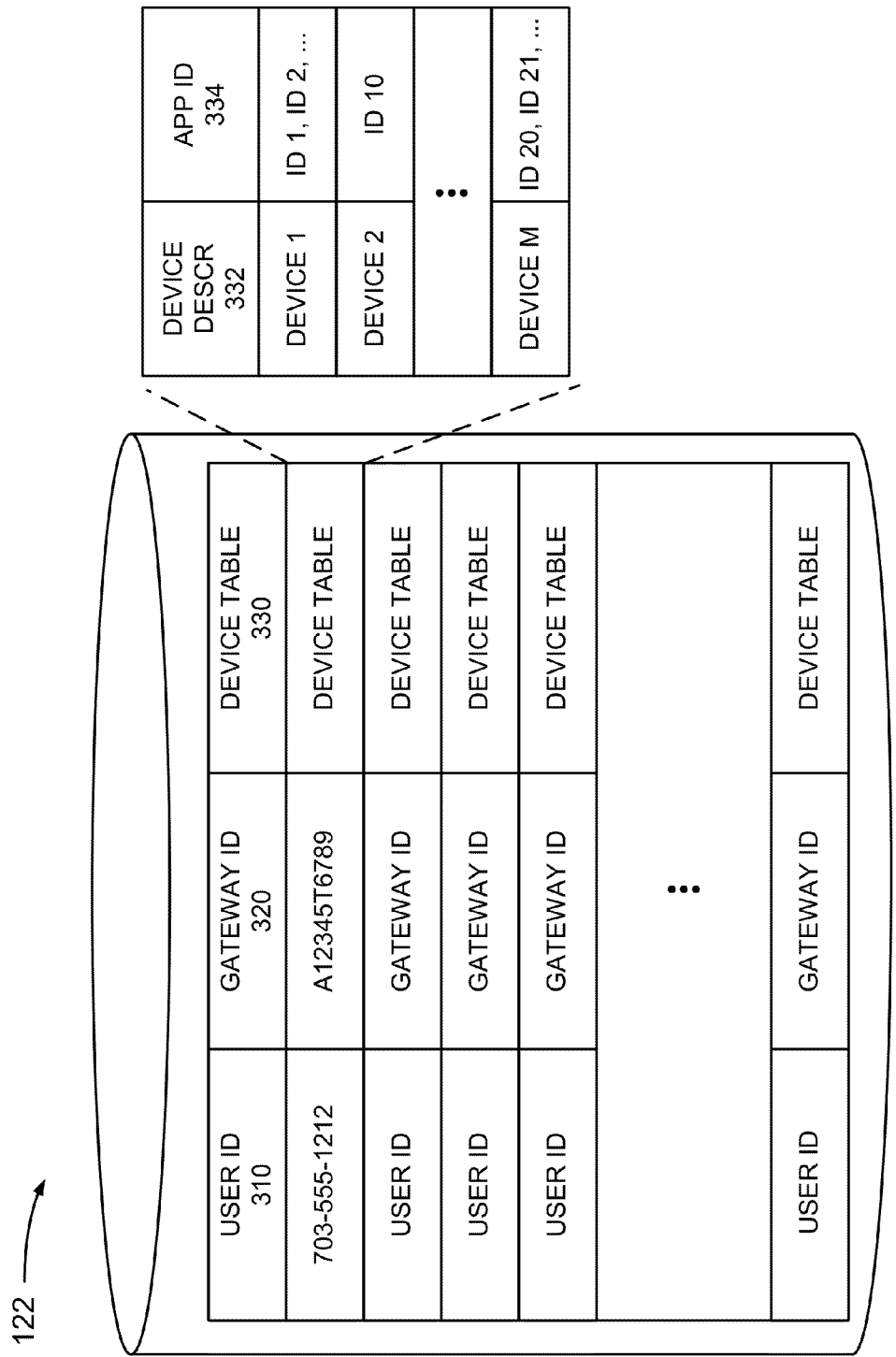
FIG. 3 is an exemplary diagram of a portion of the user database of FIG. 1 according to one exemplary embodiment.

FIG. 3 is an exemplary diagram of a portion of user database 122 according to an exemplary embodiment. It will be appreciated that user database 122 may include multiple databases stored locally at service provider network 120, or stored at one or more different and possibly remote locations.

As illustrated, user database 122 may maintain a group of entries in the following exemplary fields: a user identification (ID) field 310, a gateway device identification field 320, and a device table field 330. Each row in user database 122 may correspond to a different user record.

User identification field 310 may store a sequence of characters that identifies a user. In one embodiment, the sequence of characters may correspond to a mobile telephone number. Gateway device identification field 320 may store a sequence of characters that identifies gateway device 114 of the user's customer home network 110. In one embodiment, the sequence of characters may correspond to an Organizationally Unique Identifier (OUI) Serial Number (or other type of identifier) associated with gateway device 114. Device table field 330 may store a device table for gateway device 114 identified in gateway identification field 310. The device table may include the following exemplary fields: a device description (DESCR) field 332 and an application identification field 334. Device description field 332 may store information associated with a customer home device 112-1 through 112-N. For example, the information may include an identifier (or name) associated with the particular customer home device, one or more network addresses (e.g., an IP address, a Media Access Control (MAC) address, etc.) associated with the particular customer home device, a service description, and/or other information. Application identification field may store an identifier for each application available on the customer home device identified in device description field 332.

As one example, user database 122 may store a user record that includes a mobile telephone number of "703-555-1212" in user identification field 310, an identifier of "A12345T6789" in the gateway device identification field 320, and a device table that includes information associated with customer home devices 112, identified as "devices 1-M," and one or more application identifiers for each customer home device 1-M.

Although FIG. 3 shows exemplary fields of user database 122, in other embodiments, user database 122 may contain fewer, different, or additional fields than depicted in FIG. 3.

FIG. 4 is an exemplary diagram of a portion of application database 123 according to an exemplary embodiment. It will be appreciated that application database 123 may include multiple databases stored locally at service provider network 120, or stored at one or more different and possibly remote locations.

As illustrated, application database 123 may maintain a group of entries in the following exemplary fields: an application (APP) name field 410, application identification field 420, an Internet Protocol (IP) core protocol field 430, a port number (NO) field 440, a transport protocol field 450, and an additional information (INFO) field 460. Each row in application database 123 may correspond to an entry relating to a different application profile.

Application name field 410 may store a name of an application residing on a customer home device 112-1 through 112-N. Application identification field 420 may store a sequence of characters that uniquely identifies the application in application name field 410. IP core protocol field 430 may store information identifying the IP core protocol that the application in application identification field 420 may use to transmit/receive traffic. For example, in one embodiment, IP core protocol field 430 may identify the IP core protocol as the Transmission Control Protocol (TCP), the User Datagram Protocol (UDP), the Real-Time Protocol (RTP), etc. Port number field 440 may identify one or more port numbers of gateway device 114 that the application identified in application identification field 420 may use for transmitting/receiving traffic. Transport protocol field 450 may store information identifying a transport protocol identifier and/or name that the application identified in application may use. For example, in one embodiment, transport protocol field 450 may identify the transport protocol as the HyperText Transfer Protocol (HTTP), the File Transfer Protocol (FTP), etc. Additional information field 460 may store additional information relating to the application identified in application identification field 420. For example, the additional information may include an application version, an icon associated with the application, a Universal Plug and Play (UPnP) service description, and/or other information relating to the application.

As one example, application database 123 may store an application profile for an application named "WEB CAM," which has an identifier of "123456." The "WEB CAM" application uses TCP as the IP core protocol, port 1 of gateway device 114, and HTTP as the transport protocol. In addition, the application profile indicates that the "WEB CAM" application is version 1.2.

Although FIG. 4 shows exemplary fields of application database 123, in other embodiments, application database 123 may contain fewer, different, or additional fields than depicted in FIG. 4.

Figure 5:
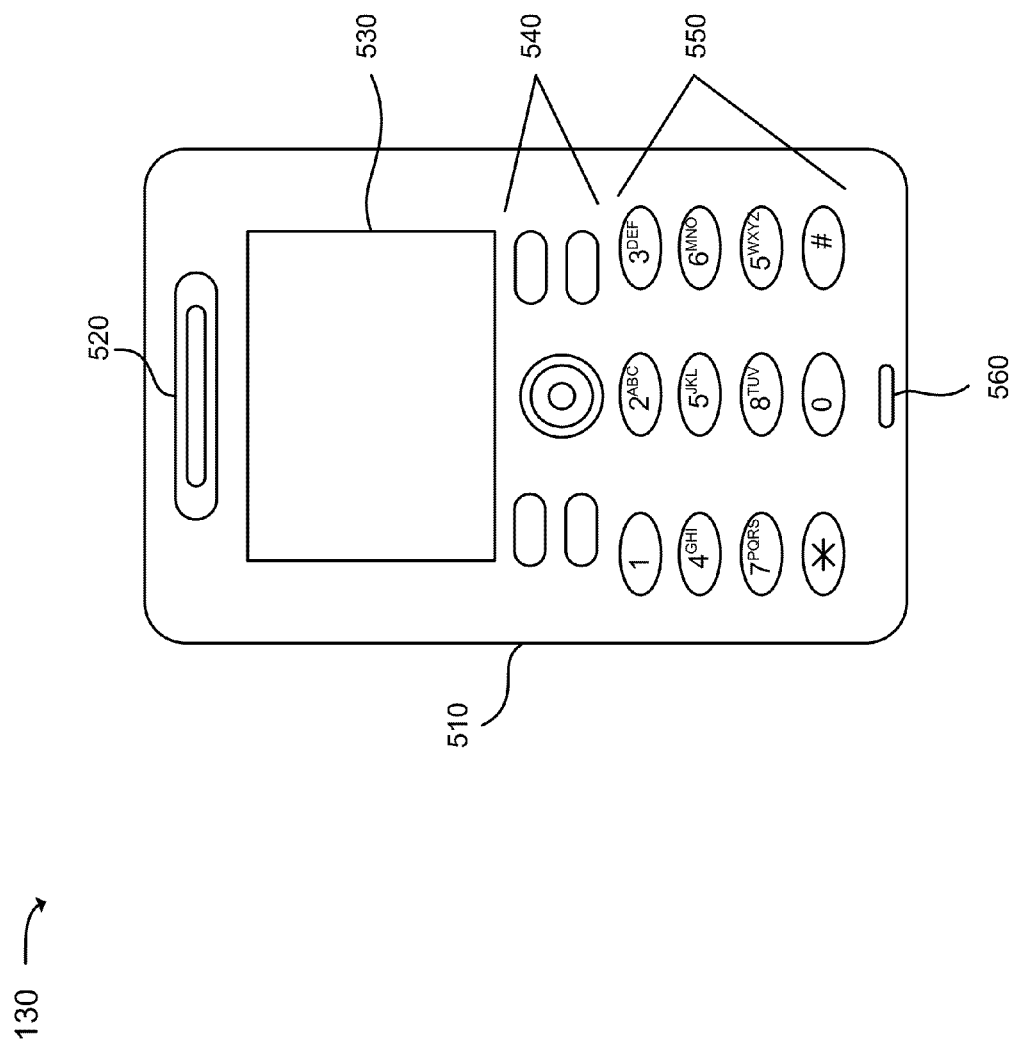
FIG. 5 is an exemplary front view of the customer remote device of FIG. 1 according to one exemplary embodiment.

FIG. 5 is an exemplary front view of customer remote device 130 according to one exemplary embodiment. As shown in FIG. 5, customer remote device 130 may include a housing 510, a speaker 520, a display 530, control buttons 540, a keypad 550, and/or a microphone 560. Housing 510 may protect the components of customer remote device 510 from outside elements. Speaker 520 may provide audible information to a user of customer remote device 130.

Display 530 may provide visual information to the user. For example, display 530 may display text input into customer remote device 130, text and/or graphics files (e.g., a picture, a word processing document, etc.) received from another device, such as a customer home device 112-1 through 112-N, and/or information regarding incoming or outgoing calls or text messages, media, games, phone books, address books, the current time, etc. Control buttons 540 may permit the user to interact with customer remote device 130 to cause customer remote device 130 to perform one or more operations. For example, control buttons 540 may be used to cause customer remote device 130 to transmit information. Keypad 550 may include a standard telephone keypad, an expanded telephone keypad, a full QWERTY keypad, etc. Microphone 560 may receive audible information from the user.

Although FIG. 5 shows exemplary components of customer remote device 130, in other embodiments, customer remote device 130 may include fewer, different, or additional components than depicted in FIG. 5. In still other embodiments, one component of customer remote device 130 may perform one or more of the tasks described as performed by another component of customer remote device 130.

Figure 6:
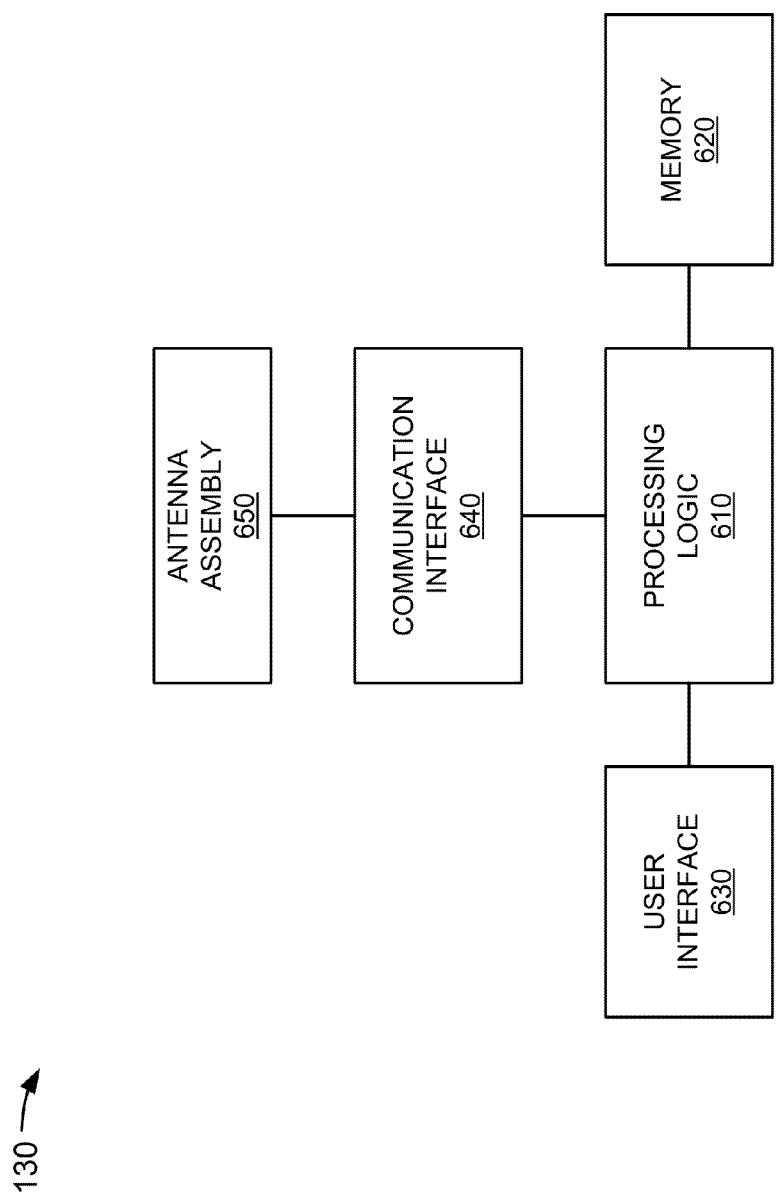
FIG. 6 is a diagram of exemplary components of the customer remote device of FIG. 1 according to one exemplary embodiment.

FIG. 6 is a diagram of exemplary components of customer remote device 130 according to one exemplary embodiment. As shown in FIG. 6, customer remote device 130 may include processing logic 610, memory 620, a user interface 630, a communication interface 640, and/or an antenna assembly 650. Processing logic 610 may include a processor, microprocessor, an ASIC, FPGA, or the like. Processing logic 610 may control operation of customer remote device 130 and its components. Memory 620 may include a RAM, a ROM, and/or another type of memory to store data and instructions that may be used by processing logic 610.

User interface 630 may include mechanisms for inputting information to customer remote device 130 and/or for outputting information from customer remote device 130. Examples of input and output mechanisms might include buttons (e.g., control buttons 540, keys of keypad 550, a joystick, etc.) to permit data and control commands to be input into customer remote device 130; a speaker (e.g., speaker 520) to receive electrical signals and output audio signals; a microphone (e.g., microphone 560) to receive audio signals and output electrical signals; a display (e.g., display 530) to output visual information (e.g., text input into customer remote device 130); and/or a vibration mechanism to cause customer remote device 130 to vibrate.

Communication interface 640 may include, for example, a transmitter that may convert baseband signals from processing logic 610 to radio frequency (RF) signals and/or a receiver that may convert RF signals to baseband signals. Alternatively, communication interface 640 may include a transceiver to perform functions of both a transmitter and a receiver. Communication interface 640 may connect to antenna assembly 650 for transmission and/or reception of the RF signals. Antenna assembly 650 may include one or more antennas to transmit and/or receive RF signals over the air. Antenna assembly 650 may, for example, receive RF signals from communication interface 640 and transmit them over the air and receive RF signals over the air and provide them to communication interface 640. In one embodiment, for example, communication interface 640 may communicate with a network, such as network 140.

As will be described in detail below, customer remote device 130 may perform certain operations in response to processing logic 610 executing software instructions of an application contained in a computer-readable medium, such as memory 620. The software instructions may be read into memory 620 from another computer-readable medium or from another device via communication interface 640. The software instructions contained in memory 620 may cause processing logic 610 to perform processes that will be described later. Alternatively, hardwired circuitry may be used in place of or in combination with software instructions to implement processes described herein. Thus, embodiments described herein are not limited to any specific combination of hardware circuitry and software.

Although FIG. 6 shows exemplary components of customer remote device 130, in other embodiments, customer remote device 130 may include fewer, different, or additional components than depicted in FIG. 6. In still other embodiments, a component of customer remote device 130 may perform one or more of the tasks described as performed by another component of customer remote device 130.

Figure 7:
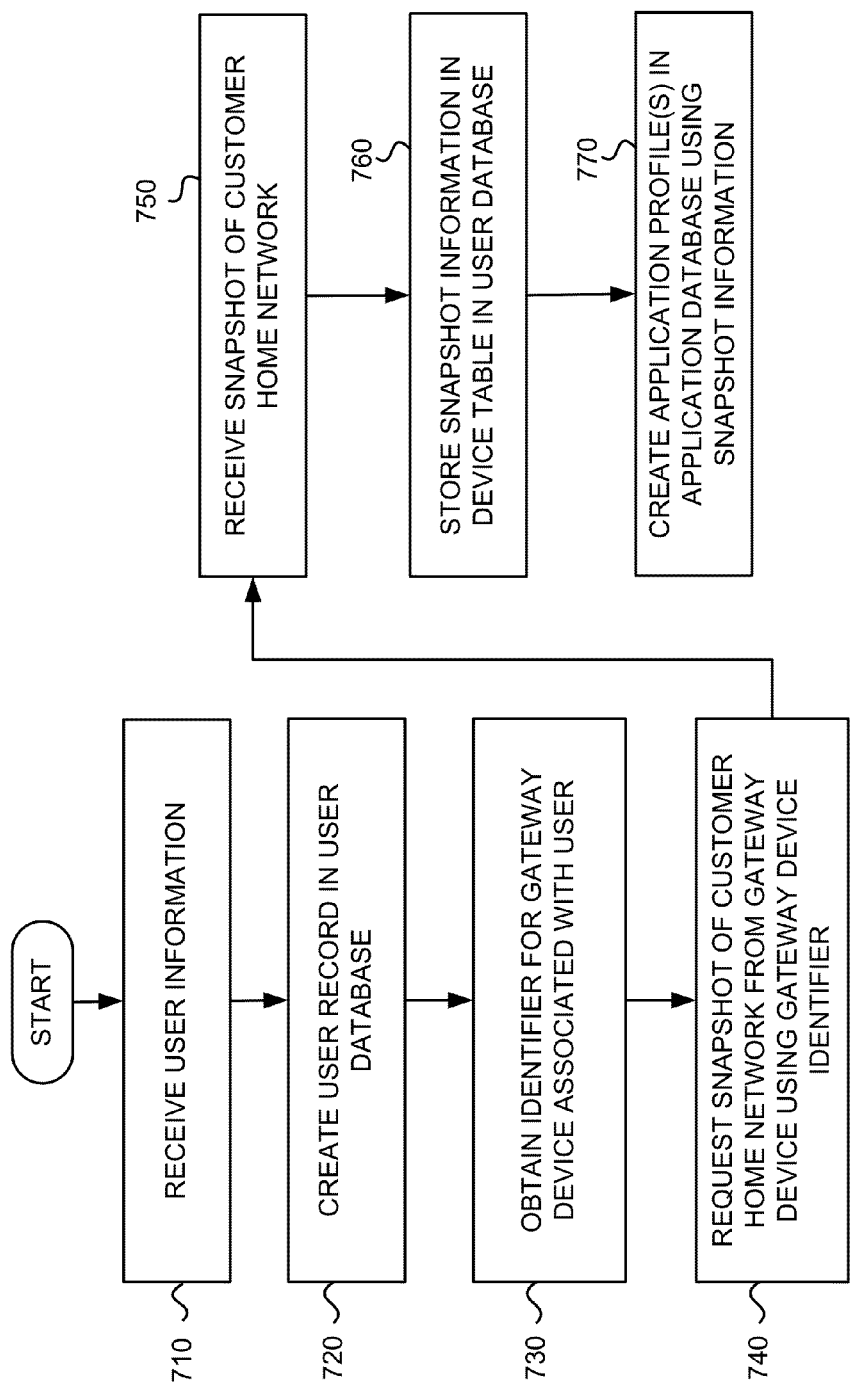
FIG. 7 is a flow chart of an exemplary process, consistent with exemplary embodiments, for registering a user for remote access to the user's customer home network.

FIG. 7 is a flow chart of an exemplary process, consistent with exemplary embodiments, for registering a user for remote access to the user's customer home network. In one embodiment, the processing of FIG. 7 may be performed by one or more components within service provider network 120. In another embodiment, some or all of the processing described below may be performed by another component or group of components including or excluding components within service provider network 120.

Processing may begin with service provider network 120 receiving user information from a user (block 710). For example, the user may use customer remote device 130 to connect to registration server 126. In one embodiment, the user may connect to registration server 126 using a web browser on customer remote device 130. Alternatively, customer remote device 130 may include an application that, upon execution, automatically establishes a connection to registration server 126. Upon connection to registration server 126, the user may provide, via customer remote device 130, user information to registration server 126. The user information may include, for example, a name, a home address, a mobile telephone number, etc. Alternatively, registration server 126 may determine this information automatically (e.g., by detecting a telephone number associated with customer remote device 130 (e.g., via automatic number identification) and using the detected telephone number to obtain information for the user from a database).

Service provider network 120 may create a user record for the user (block 720). For example, registration server 126 may use some or all of the information received from the user to create the user record in user database 122. In one embodiment, registration server 126 may create a new entry in user database 122 and store, for example, a telephone number associated with customer remote device 130 in user identification field 310.

Service provider network 120 may obtain an identifier for gateway device 114 associated with customer home network 110 (i.e. the user's customer home network) (block 730). For example, in one exemplary embodiment, registration server 126 may obtain the identifier for gateway device 114 from the user. In another exemplary embodiment, registration server 126 may obtain the identifier for gateway device 114 from a database that associates information relating to the user with the identifier (e.g., registration server 126 may look up the identifier for gateway device 114 using, for example, the user's name, address, and/or other information). Registration server 126 may store the obtained identifier for gateway device 114 in the new user record (e.g., in gateway identification field 320).

Service provider network 120 may request a snapshot of customer home network 110 from gateway device 114 using the identifier of gateway device 114 (block 740). For example, registration server 120 may transfer the obtained identifier for gateway device 114 to connectivity server 125/auto-configuration server 121. Reference to "connectivity server 125/auto-configuration server 121" may correspond to a connectivity server 125-auto-configuration server 121 interaction via a TR-069 Northbound Interface. Registration server 120 may subscribe with connectivity server 125 to receive notifications relating to the identifier for gateway device 114.

Connectivity server 125/auto-configuration server 121 may look up a network address (e.g., an IP address) for gateway device 114 using the identifier for gateway device 114 (e.g., from a database that associates the identifier of gateway device 114 with the network address for gateway device 114). Connectivity server 125/auto-configuration server 121 may send the request for a snapshot of customer home network 110 to gateway device 114 using the network address.

In response to receiving the request, gateway device 114 may obtain the snapshot of customer home network 110. In one exemplary embodiment, gateway device 114 may obtain the snapshot of customer home network 110 using the Universal Plug and Play discovery and description procedures. Other procedures for obtaining the snapshot of customer home network 110 may alternatively be used. The snapshot may include information regarding the type of each customer home device 112-1 through 112-N, an identifier for each customer home device 112-1 through 112-N, and/or one or more network addresses (e.g., an IP address, a MAC address, etc.) for each customer home device 112-1 through 112-N. The snapshot may also include, for each customer home device 112-1 through 112-N, vendor-specific information, such as the model name and number, serial number, manufacturer name, etc. The snapshot may further include, for each customer home device 112-1 through 112-N, a list of applications associated with the customer home device and information relating to the applications, such as an application name, an application identifier, an IP core protocol used by the application, a port number used by the application, a transport protocol used by the application, and/or additional information. Gateway device 114 may transmit the snapshot to service provider network 120.

Service provider network 120 may receive the snapshot of customer home network 110 from gateway device 114 (block 750). For example, connectivity server 125/auto-configuration server 121 may receive the snapshot from gateway device 114.

Service provider network 120 may store information from the received snapshot into a device table in user database 122 (block 760). For example, connectivity server 125/auto-configuration server 121 may transfer the received snapshot to registration server 126 based on registration server 126's subscription with connectivity server 125. Registration server 126 may store information from the received snapshot into the device table in device table field 330 in the newly created user record for the user. The stored information may include description information for each customer home device 112-1 through 112-N and a list of application identifiers for each customer home device 112-1 through 112-N.

Service provider network 120 may further create one or more application profiles in application database 123 for the applications residing on customer home devices 112 using information from the snapshot (block 770). For example, registration server 126 may create an application profile in application database 123 for each application residing on a customer home device 112-1 through 112-N. As illustrated in FIG. 4, each application profile may include an application name, an application identifier, an IP core protocol used by the application (e.g., TCP, UDP, etc.), the port number used by the application, the transport protocol used by the application (HTTP, FTP, etc.), and/or other information associated with the application (e.g., version number, an icon, the Universal Plug and Play service description for the application, etc.).

Figure 8:
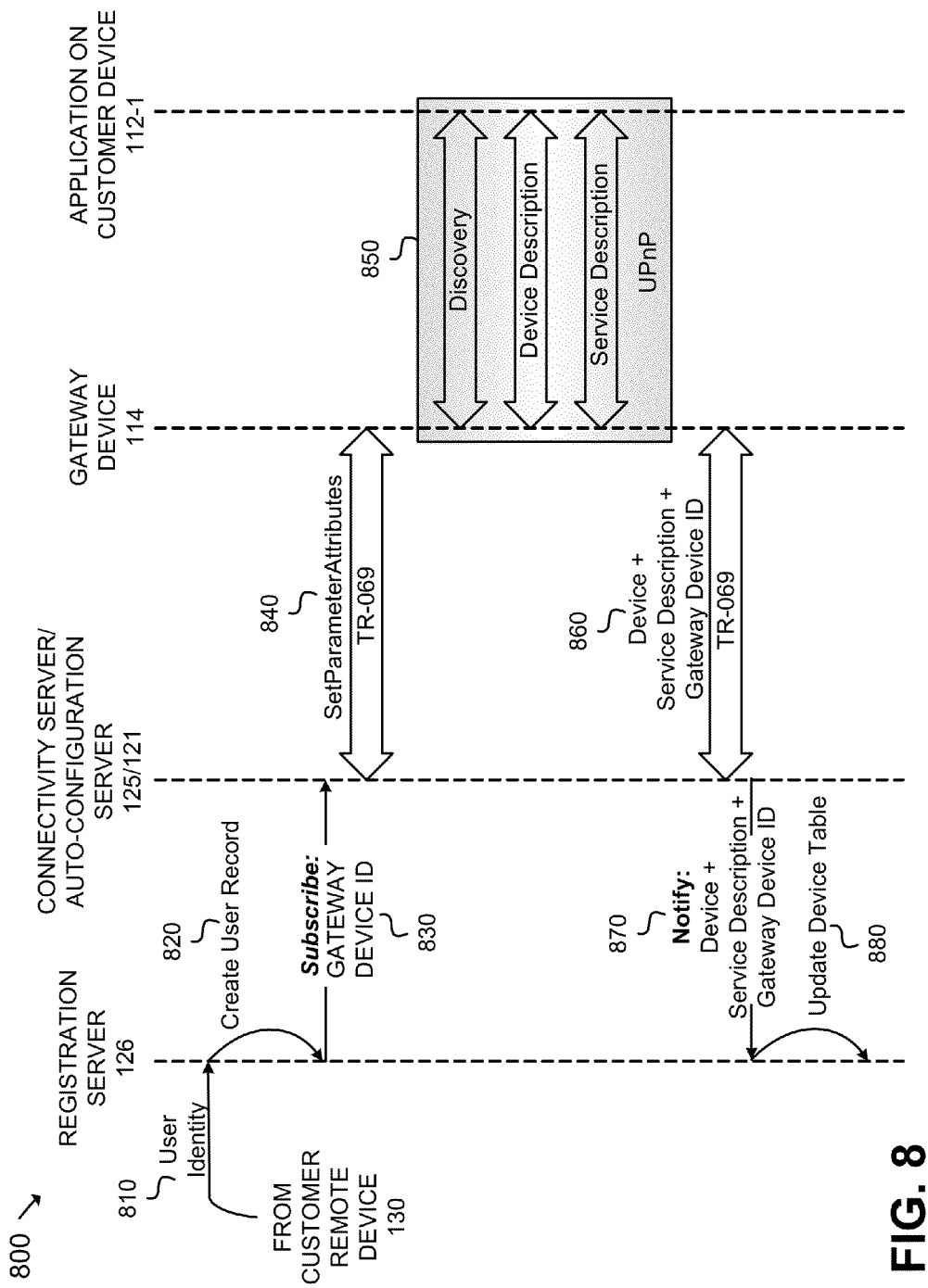
FIG. 8 is an example of the interaction of components of the service provider network and the customer home network in the processing of FIG. 7.

FIG. 8 is an example 800 of the interaction of components of service provider network 120 and customer home network 110 in the processing described above with respect to FIG. 7. As illustrated in FIG. 8, processing may begin with registration server 126 receiving user identity information from customer remote device 130 (act 810). In response, registration server 126 may create a user record in user database 123 (not shown) (act 820). Registration server 126 may further send a subscribe message to connectivity server 125/auto-configuration server 121 that includes an identifier for gateway device 114 (act 830). Connectivity server 125/auto-configuration server 121 may transfer a request (e.g., a TR-069-compliant request, referred to as a SetParameterAttribute method call in FIG. 8) to gateway device 114 for customer home device information (act 840). In response to receiving the request, gateway device 114 may perform Universal Plug and Play discovery and description procedures to obtain device description information and application (or service) description information. For example, gateway device 114 may interact with an application on customer device 112-1 to obtain device description information and application (or service) description information (act 850).

Gateway device 114 may transmit the device and application (or service) descriptions and the identifier for gateway device 114 to connectivity server 125/auto-configuration server 121 in a TR-069-compliant response (act 860). In response to receiving the information from gateway device 114, connectivity server 125/auto-configuration server 121 may send a notify message to registration server 126 that includes the device and application (or service) descriptions and the identifier for gateway device 114 (act 870). Registration server 126 may then update a device table in the newly created user record (act 880).

Figure 9:
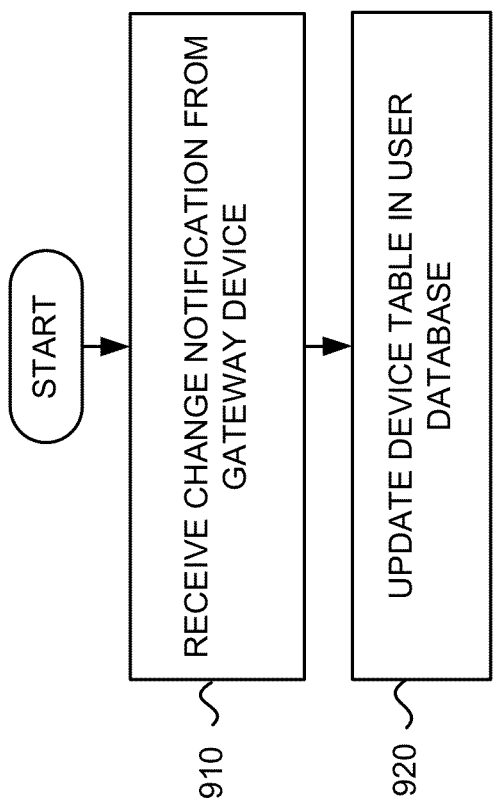
FIG. 9 is a flow chart of an exemplary process, consistent with exemplary embodiments, for updating a user's device table.

FIG. 9 is a flow chart of an exemplary process, consistent with exemplary embodiments, for updating a user's device table. In one embodiment, the processing of FIG. 9 may be performed by one or more components within service provider network 120. In another embodiment, some or all of the processing described below may be performed by another component or group of components including or excluding components within service provider network 120.

As indicated above, registration server 126 may subscribe to receive updates for the identifier of gateway device 114. Moreover, gateway device 114 may be configured to send status changes in customer home network 110 to connectivity server 125/auto-configuration server 121. Processing may begin with service provider network 120 receiving a change notification from gateway device 114 (block 910). For example, connectivity server 125/auto-configuration server 121 may receive the change notification from gateway device 114. The change notification may include a customer home device joining customer home network 110, a customer home device leaving customer home network 110, a customer home device being reconfigured, etc.

Service provider network 120 may update the appropriate device table in user database (block 920). For example, connectivity server 125/auto-configuration server 121 may transfer the change notification to registration server 126 based on registration server 126's subscription to receive notifications relating to the identifier associated with gateway device 114. In response to receiving the change notification, registration server 126 may update the appropriate device table in device table field 330 to reflect the information in the change notification. In this way, registration server 126 ensures that user database 122 stores the most recent information regarding customer home network 110.

Figure 10:
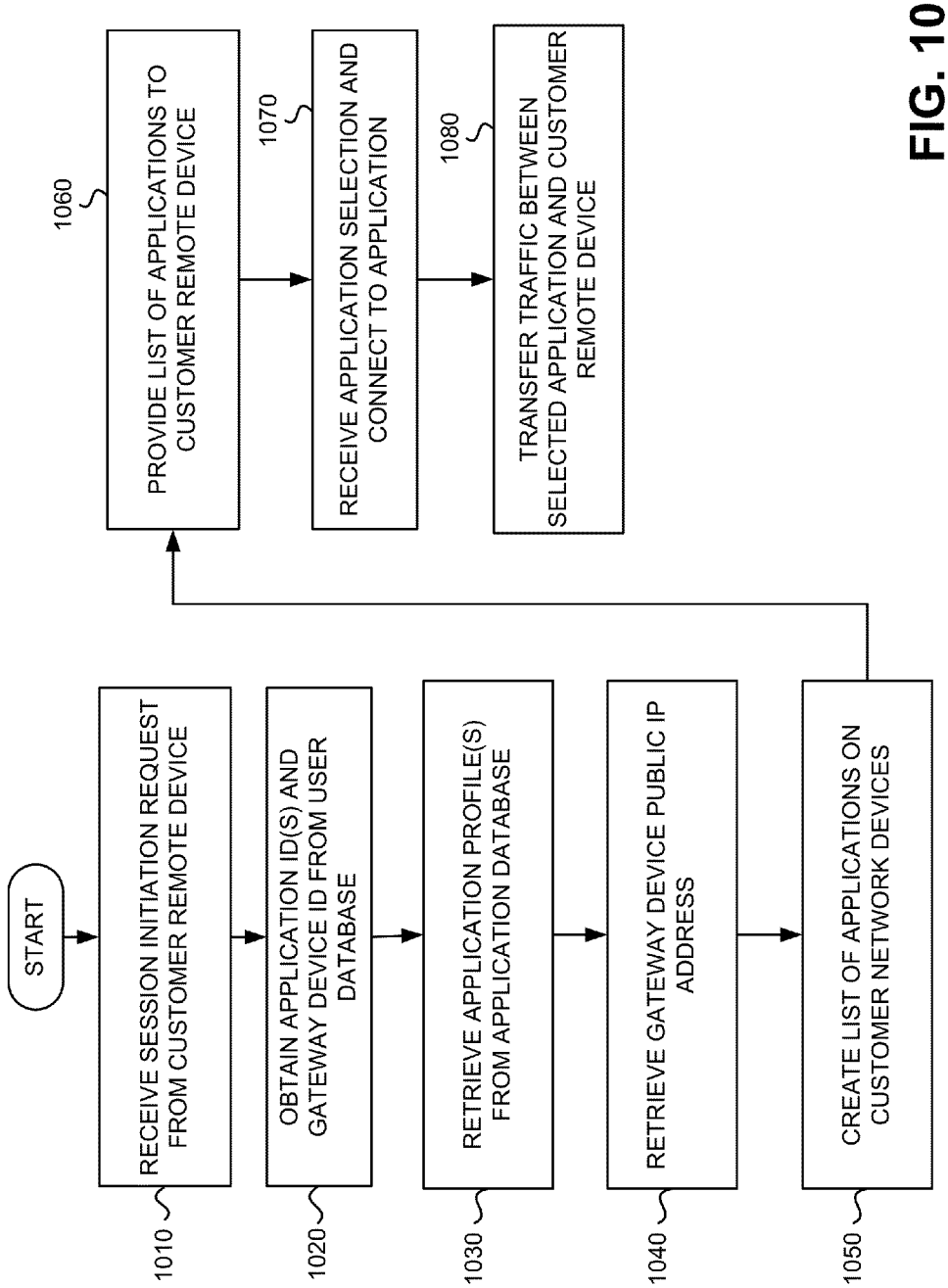
FIG. 10 is a flow chart of an exemplary process, consistent with exemplary embodiments, for remotely interacting with an application in the customer home network of FIG. 1.

FIG. 10 is a flow chart of an exemplary process, consistent with exemplary embodiments, for remotely interacting with an application in customer home network 110. In one embodiment, the processing of FIG. 10 may be performed by one or more components within service provider network 120. In another embodiment, some or all of the processing described below may be performed by another component or group of components including or excluding components within service provider network 120.

Processing may begin with service provider network 120 receiving a session initiation request from customer remote device 130 (block 1010). For example, a user of customer remote device 130 may initiate a session by sending a session initiation request to wireless application server 124. In one embodiment, the session initiation request may include a user identifier (e.g., a telephone number associated with customer remote device 130).

Service provider network 120 may obtain application identifier(s) for the user and an identifier for gateway device 114 from user database 122 (block 1020). For example, wireless application server 124 may use the user identifier received in the session initiation request to identify a user record from user database 122. Wireless application server 124 may obtain the gateway device identifier and application identifiers from gateway identifier field 320 and device table field 330 of the user record.

Service provider network 120 may retrieve application profile(s) from application database 123 (block 1030). For example, wireless application server 124 may use the application identifiers obtained from user database 122 to obtain the appropriate application profiles from application database 123.

Service provider network 120 may retrieve the public IP address for gateway device 114 (block 1040). For example, wireless application server 124 may send the identifier for gateway device 114 to connectivity server 125/auto-configuration server 121. Connectivity server 125/auto-configuration server 121 may use the identifier of gateway device 114 to look up a public IP address for gateway device 114 from a database that associates the gateway device identifier with a public IP address. Connectivity server 125/auto-configuration server 121 may transfer the public IP address of gateway device 114 to wireless application server 124. Wireless application server 124 may start a session timer for the user's session upon receipt of the public IP address of gateway device 114.

Service provider network 120 may create a list of applications that reside on customer home devices 112 (block 1050). For example, wireless application server 124 may send the public IP address of gateway device 114 and the retrieved application profiles to connectivity server 125/auto-configuration server 121. Connectivity server 125/auto-configuration server 121 may connect to each application on customer home devices 112 and determine whether the application is available. In some instances, a customer home device 112-1 through 112-N may be powered down, disconnected, etc. Thus, by connecting to each application, connectivity server 125/auto-configuration server 121 may determine whether the application is available. Connectivity server 125/auto-configuration server 121 may create a list of applications that includes information identifying each application that is determined to be available.

Service provider network 120 may provide the list of applications to customer remote device 130 (block 1060). For example, wireless application server 124 may transmit the application list to customer remote device 130 via network 140.

Customer remote device 130 may display the list of applications to the user. In response, the user may select an application from the list in any known manner.

Service provider network 120 may receive the application selection (block 1070). For example, wireless application server 124 may receive an identifier for an application from customer remote device 130 in response to the user selecting the application. Wireless application server 124 may connect to the application indirectly by, for example, requesting connectivity server 125 to forward the application port(s) on gateway device 114. Connection to the application may involve connectivity server 125/auto-configuration server 121 opening the appropriate port on gateway device 114 for the selected application.

Service provider network 120 may transfer traffic between the selected application and customer remote device 130 (block 1080). For example, wireless application sever 124 may transfer traffic to the application on a customer home device 112-1 through 112-N (through gateway device 114) from customer remote device 130 and to customer remote device 130 from the application. During the transfer, wireless application server 124 may perform protocol conversion. For example, the application may implement a variety of transport protocols. A typical personal computer may support, for example, CIFS/SMB that allows browsing of the file system and reading/writing files. Further, network attached storage devices may implement Network File Server (NFS), CIFS/SMB, FTP, etc. A modern gateway device 114 may implement HTTP/HTTPS on network 140 side and CIFS/SMB on customer home network 110 side.

When wireless application server 124 receives requests from customer remote device 130, wireless application server 124 may invoke a protocol adapter according to the application profile associated with the application selected. For example, if the user-selected customer home device 112-1 through 112-N is a network attached storage device that supports only FTP, wireless application server 124 may translate the requests from customer remote device 130 to FTP commands. If the user-selected customer home device 112-1 through 112-N supports the Universal Plug and Play protocol, wireless application server 124 may invoke a protocol adapter that transforms the requests from customer remote device 130 to, for example, Universal Plug and Play Simple Object Access Protocol (SOAP) methods.

During the transfer of traffic between the selected application and customer remote device 130, wireless application server 124 may also perform data conversion. Whether data conversion is to be performed may depend on the type of data requested by customer remote device 130. When customer remote device 130 interacts with the selected application, customer remote device 130 may send the Multipurpose Internet Mail Extensions (MIME) content type that customer remote device 130 accepts. Wireless application server 124 may receive data from the selected application, invoke the corresponding application, convert the data, and send the converted data to customer remote device 130. Examples of data conversions that may be performed include converting an image from an original format to a format that is acceptable to customer remote device 130 (e.g., to a Graphic Interchange Format (GIF), Joint Photographic Experts Group (JPG) format, Tagged Image File Format (TIFF), Portable Network Graphics (PNG) format, etc.), extracting text from Microsoft Word® and Portable Document Format (PDF) files, converting audio/video files and streams (e.g., Moving Picture Experts Group layer 3 (MP3) format, Qualcomm PureVoice® codec (QCELP), MPEG-4, $3^{rd}$ Generation Partnership Project (3GPP) format, etc.), etc. Customer remote device 130 may provide information regarding data that is to be sent to customer remote device 130. For example, customer remote device 130 may provide a screen size for MIME "image" content-type data or an amount of "text" type data that customer remote device 130 is capable of receiving. If such information is available to wireless application server 124, wireless application server 124 may take the appropriate action, (e.g., resizing an image, paginating text data, etc.).

The user's session may terminate when the session timer expires. In one embodiment, the session timer may reset every time wireless application server 124 receives a request from customer remote device 130. Thus, the session lasts as long as the user interacts with the selected application. The user's session may further terminate when the user selects another application. In response to the session terminating, service provider network 120 may close the port on gateway device 114 for the selected application.

Figure 11:
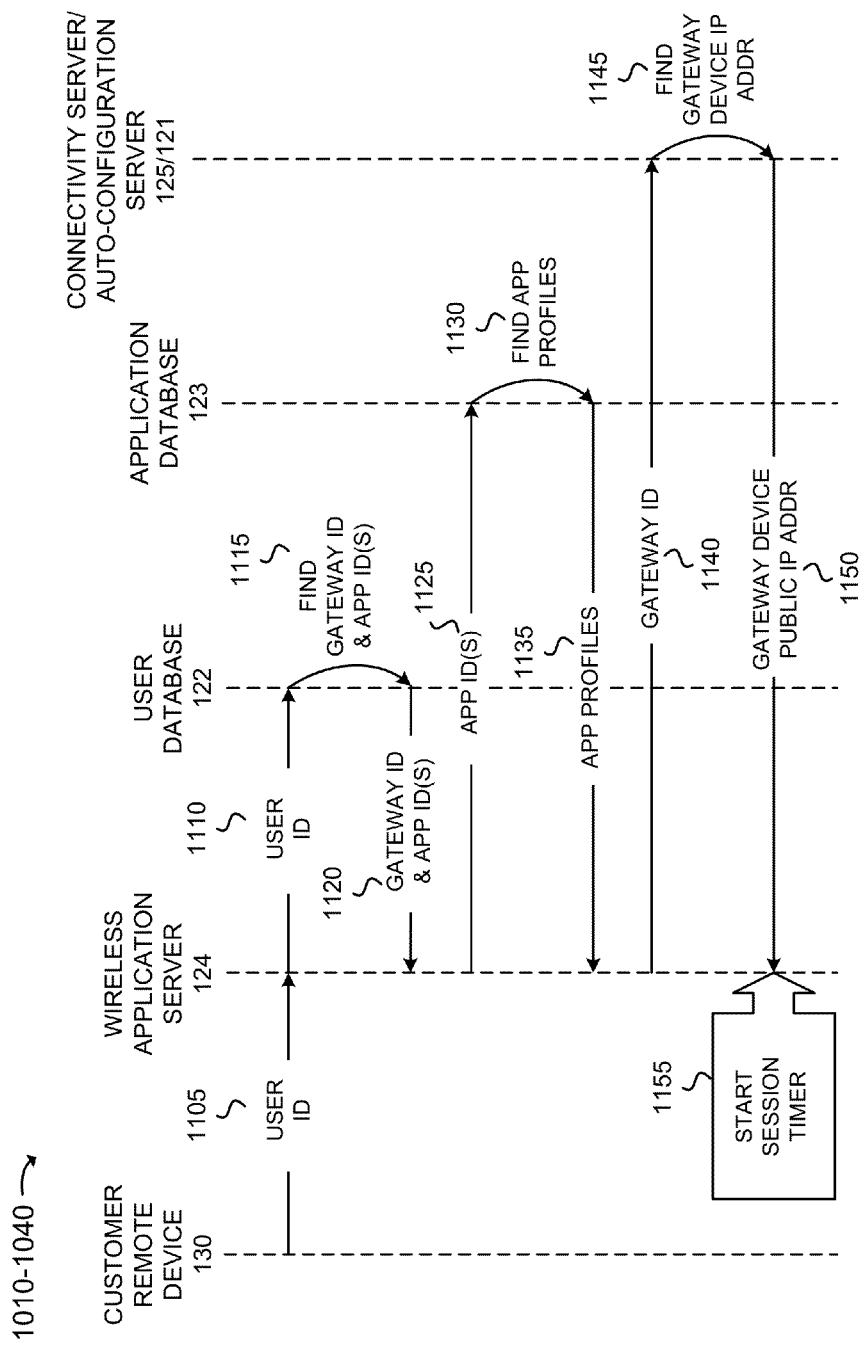
FIGS. 11-14 are examples of the processing described in FIG. 10.

FIG. 11 is an example of the processing described above with respect to blocks 1010-1040 of FIG. 10. As illustrated in FIG. 11, processing may begin with a user of customer remote device 130 initiating a session by sending a session initiation request, which includes a user identifier, to wireless application server 124 (act 1105). In response, wireless application server 124 may use the user identifier to obtain an identifier for gateway device 114 and identifiers for applications residing on customer home devices 112 from user database 122 (acts 1110, 1115, and 1120). Wireless application server 124 may use the application identifiers to obtain application profile(s) from application database 123 (acts 1125, 1130, and 1135). Wireless application server 124 may send the identifier for gateway device 114 to connectivity server 125/auto-configuration server 121 (act 1140). Connectivity server 125/auto-configuration server 121 may use the identifier of gateway device 114 to look up a public IP address for gateway device 114 (act 1145). Connectivity server 125/auto-configuration server 121 may transfer the public IP address of gateway device 114 to wireless application server 124 (block 1150). In response to receiving the public IP address of gateway device 114, wireless application server 124 may start a session timer (act 1155).

Figure 12:
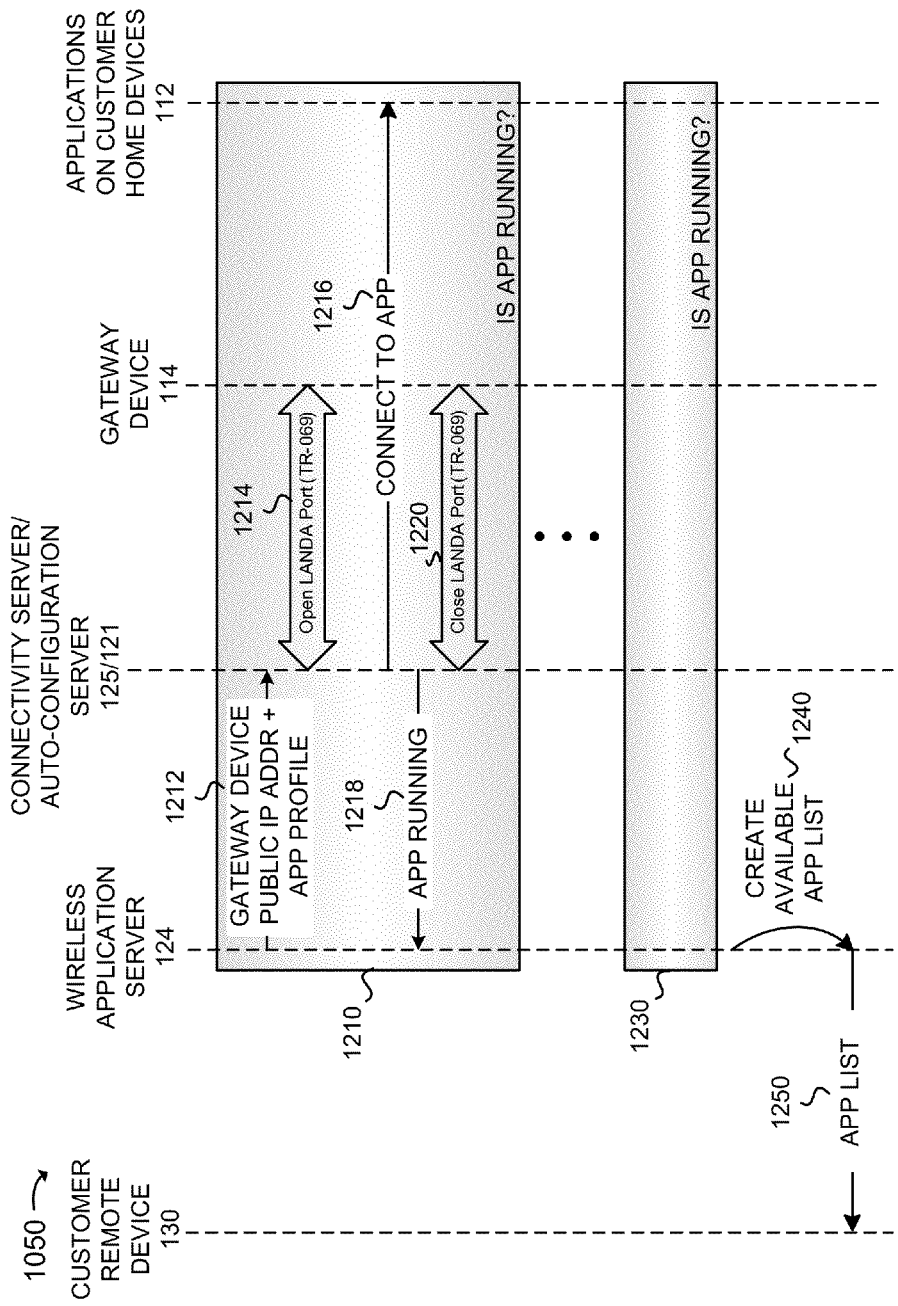

FIG. 12 is an example of the processing described above with respect to block 1050 of FIG. 10. As illustrated in FIG. 12, processing may begin with wireless application server 124 determining whether a first application on customer home devices 112 is available (act 1210). To make this determination, wireless application server 124 may send the public IP address of gateway device 114 and an application profile to connectivity server 125/auto-configuration server 121 (act 1212). Connectivity server 125/auto-configuration server 121 may send a request (e.g., a TR-069-compliant request) to gateway device 114 to request that gateway device 114 open the appropriate port of gateway device 114 for the first application (act 1214). Gateway device 114 may send an acknowledgment indicating that the port has been opened. Connectivity server 125/auto-configuration server 121 may attempt to connect to the first application on customer home devices 112 (act 1216). Connectivity server 125/auto-configuration server 121 may send an indication to wireless application server 124 indicating whether the first application is available (act 1218). Connectivity server 125/auto-configuration server 121 may send a request (e.g., a TR-069-compliant request) to gateway device 114 requesting that gateway device 114 close the port (act 1220).

Wireless application server 124 may perform the above operations for each application in customer home network 110 (act 1230) until the availability of each application has been determined. Connectivity server 125/auto-configuration server 121 may create a list of available applications (act 1240). Wireless application server 124 may transmit the application list to customer remote device 130 (act 1250).

Figure 13:
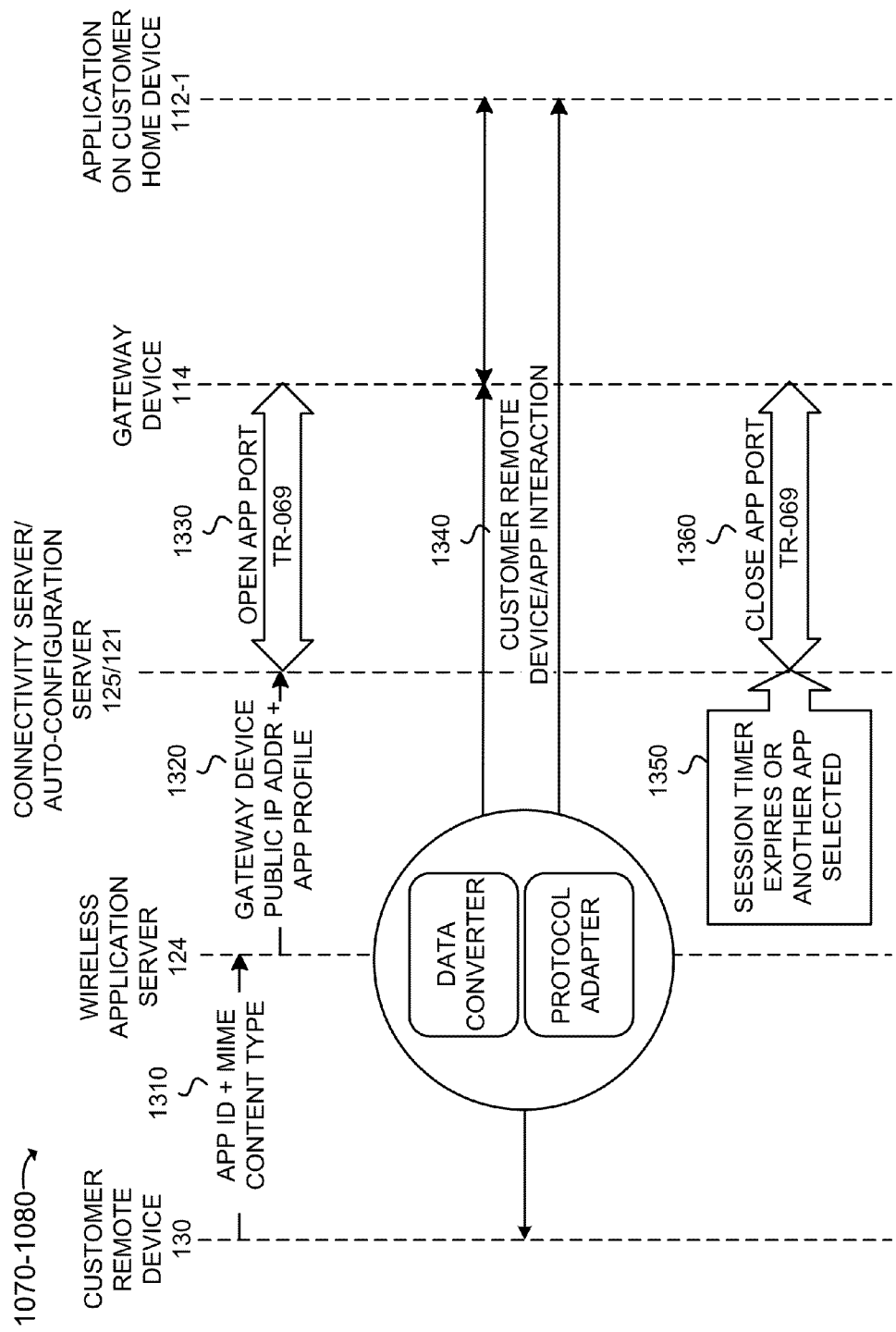

FIG. 13 is an example of the processing described above with respect to blocks 1070-1080 of FIG. 10. Assume that a user of customer remote device 130 selects an application from the list of applications provided by service provider network 120. In response to the selection, customer remote device 130 may provide an identifier for the application and the MIME content type that customer remote device 130 accepts to wireless application server 124 (act 1310). Wireless application server 124 may provide the public IP address of gateway device 114 and the application profile for the received application identifier to connectivity server 125/auto-configuration server 121 (act 1320). Connectivity server 125/auto-configuration server 121 may send a request (e.g., a TR-069-compliant request) to gateway device 114 to request that gateway device 114 open the appropriate port of gateway device 114 for the selected application (act 1330). Gateway device 114 may send an acknowledgment indicating that the port has been opened. In response, wireless application server 124 may establish a connection to the selected application. Thereafter, customer remote device 130 and the selected application may communicate (act 1340). As indicated above with respect to FIG. 10, the transfer of traffic between customer remote device 130 and the selected application may involve the conversion of data from a first format to a second format and/or the conversion of a first protocol to a second protocol.

In response to a request from customer remote device 130 or the user selecting a different application in customer home network 110 (act 1350), connectivity server 125/auto-configuration server 121 may send a request (e.g., a TR-069-compliant request) to gateway device 114 to close the port on gateway device 114 (act 1360). In response, gateway device 114 may close the port.

Figure 14:
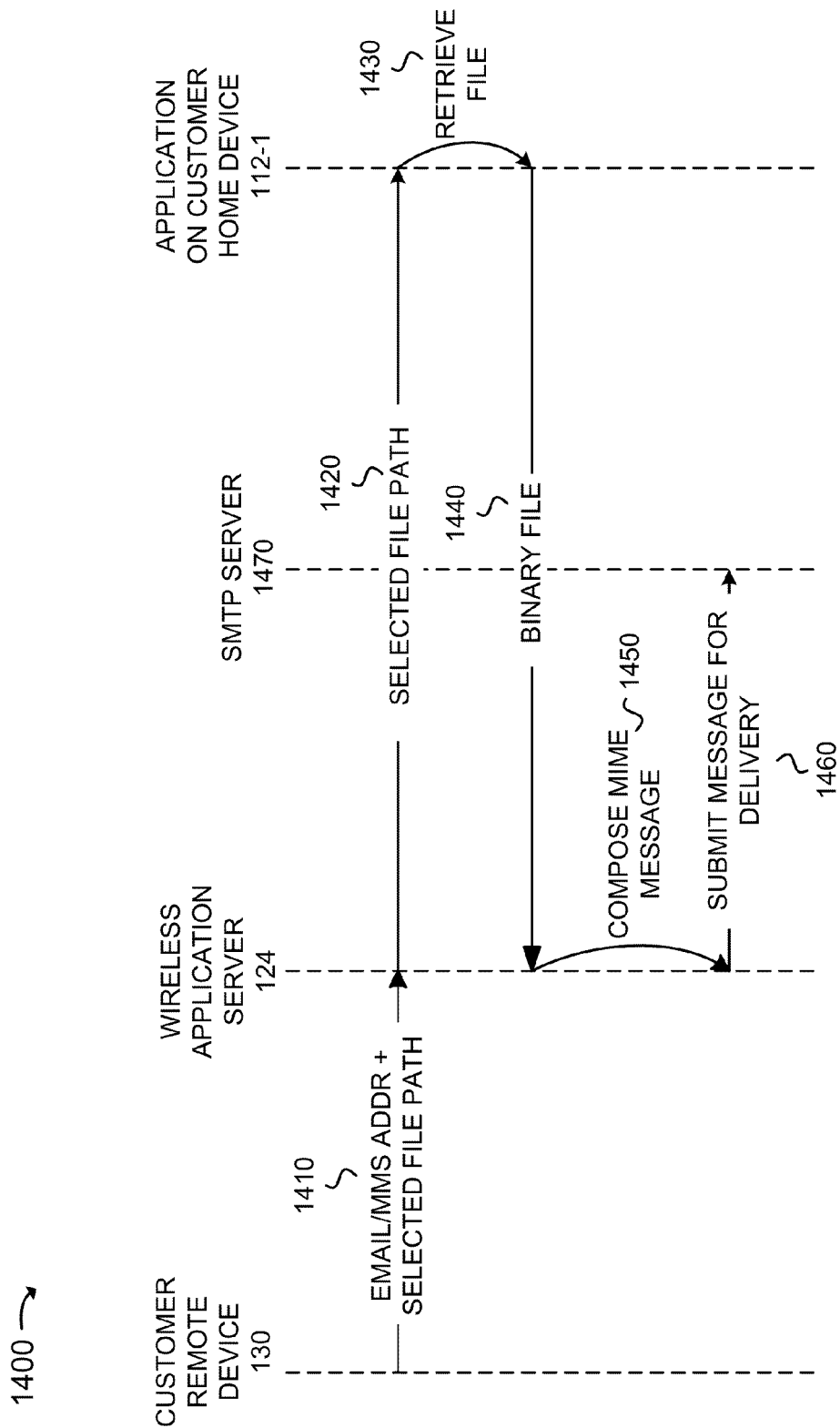

FIG. 14 is an exemplary process for interacting with an application in customer home network 110 to send an electronic mail (e-mail) message, according to an exemplary embodiment. For this process, assume that, during a session, the user desires to send a binary or image file located on a selected customer home device (e.g., customer home device 112-1) to an e-mail or Multimedia Messaging Service (MMS) recipient. Processing may begin with the user providing a path for the selected file (e.g., by selecting the file) on customer home device 112-1 and the recipient's e-mail or MMS address to wireless application server 124 (act 1410). In response, wireless application server 124 may use the path for the file to obtain the file (acts 1420-1440). Wireless application server 124 may compose the MIME multipart message with, for example, the Content-type set to application/octet-stream, Content-transfer-encoding set to base64, and Content-disposition set to attachment part headers (act 1450). Wireless application server 124 may submit the message to a Simple Mail Transfer Protocol (SMTP) server 1470 for delivery to the e-mail or MMS recipient (act 1460). After submitting the message to SMTP server 1470 for delivery, wireless application server 124 may notify the user of the submission status.

Figure 15B:
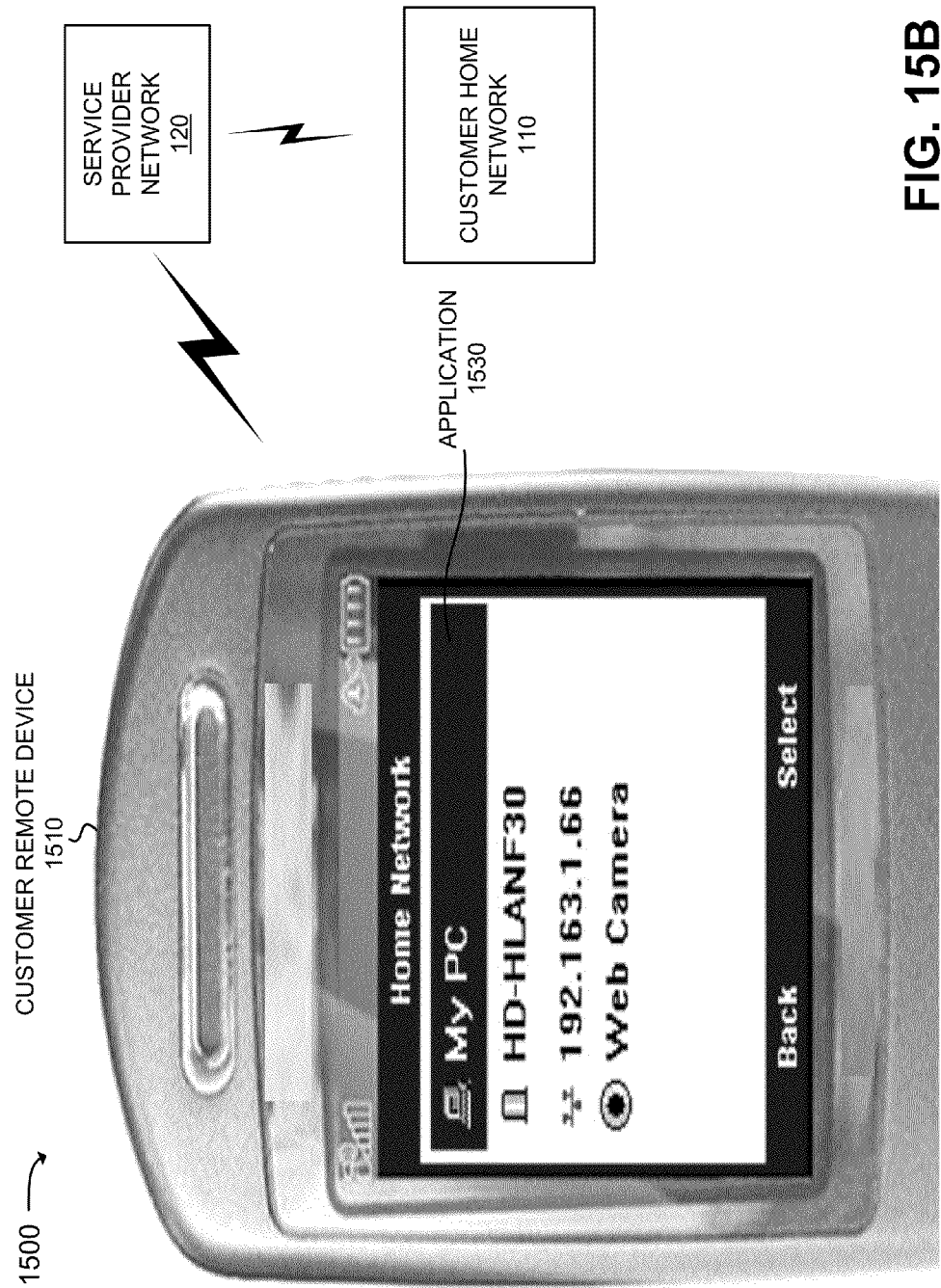
Figure 15C:
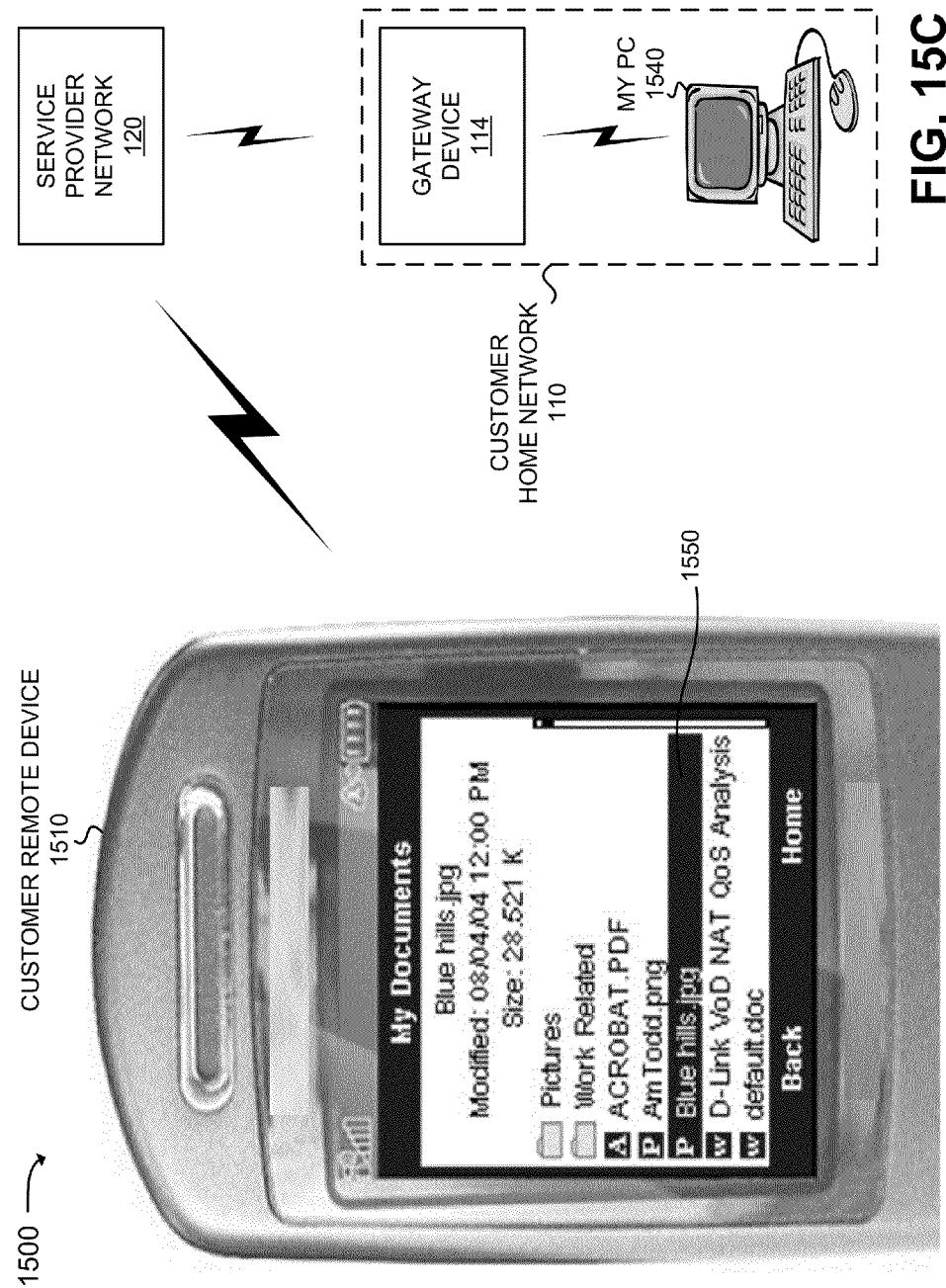

The following example 1500 of FIGS. 15A-15E illustrates the processing described above with respect to FIG. 10. In example 1500, assume that a customer remote device 1510 takes the form of a mobile telephone. Assume further a user of customer remote device 1510 desires to connect to the user's customer home network 110. As illustrated in FIG. 15A, the user may select an action 1520 in a list of actions on a display (e.g., display 530) of customer remote device 1510. In response to the selection, customer remote device 1510 may send a session initiation request to service provider network 120. Service provider 120 may create a list of applications that are available in customer home network 110 and send the list for display on customer remote device 1510, as illustrated in FIG. 15B. Assume that the user selects the application "My PC" 1530 from the list of applications. In response service provider network 120 may establish a connection to a customer home device 1540 that includes the application "My PC," as illustrated in FIG. 15C.

Figure 15D:
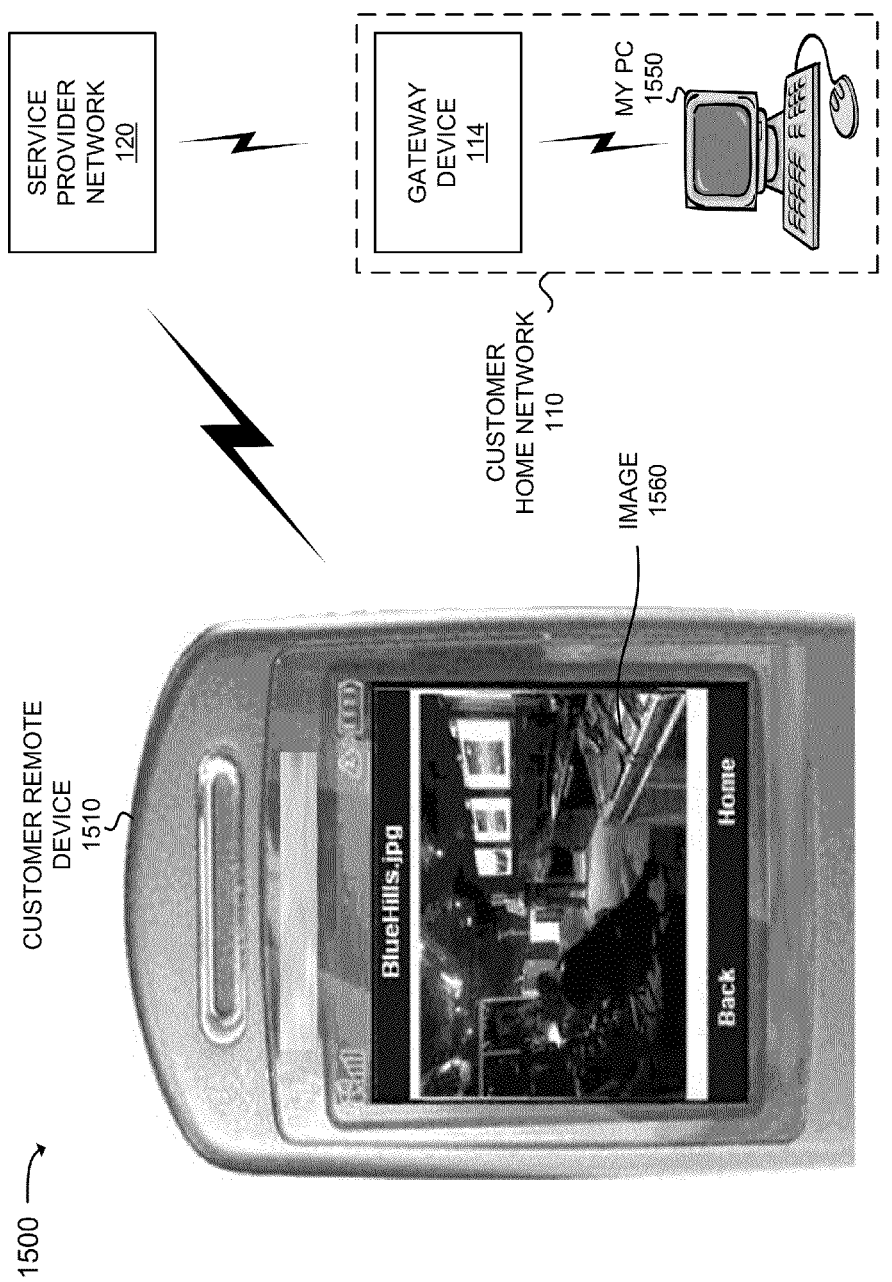

Assume that the user accesses the "My Documents" folder on customer home device 1540. In response, customer home device 1540 may transmit a list of documents within the "My Documents" folder. Assume that the user selects the image file "Blue hills.jpg" 1550. In response, customer remote device 1510 may transfer information indicating the selection to customer home device 1540. Customer home device 1540 may transfer the selected image file to customer remote device 1510. Upon receipt, customer remote device 1510 may display image 1560, as illustrated in FIG. 15D.

Figure 15E:
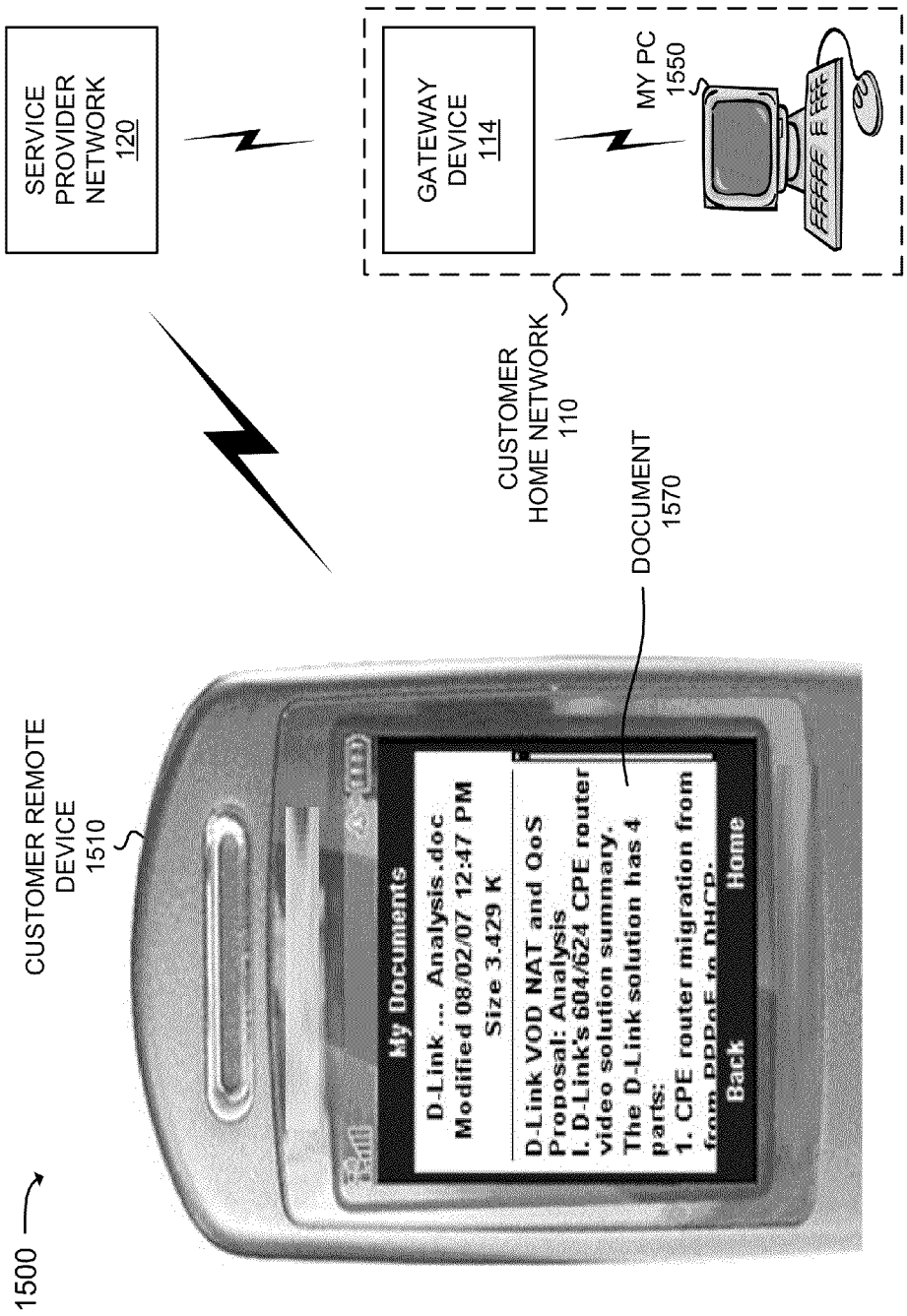

As a second example, assume in FIG. 15C that the user selects the document entitled "D-Link VoD NAT QoS Analysis" in the list of documents in the "My Documents" folder. In response, customer remote device 1510 may transfer information indicating the selection to customer home device 1540. Customer home device 1540 may transfer the selected document to customer remote device 1510. Upon receipt, customer remote device 1510 may display document 1570, as illustrated in FIG. 15E.

Embodiments described herein allow users to remotely connect to applications and documents within the user's home network. A service provider network facilitates the connection of the user's remote device to the home network and the transmission of traffic between the remote device and the home network.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while series of blocks and/or acts have been described with respect to FIGS. 7-14, the order of the acts may be varied in other embodiments. Moreover, non-dependent acts may be implemented in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by one or more servers and from a user device, a session initiation request for access to a customer home network,
        the session initiation request including information identifying the user device;
    obtaining, by the one or more servers and using the information identifying the user device, an identifier of a gateway device from identifiers of a plurality of gateway devices stored in a data structure;
    obtaining, by the one or more servers, identifiers of applications associated with the identifier of the gateway device in the data structure;
    creating, by the one or more servers and based on the identifiers of the applications, a list of applications that are available on devices within the customer home network;
    providing, by the one or more servers, the list of applications to the user device;
    receiving, by the one or more servers and from the user device, selection of identification information of an application in the list of applications;
    establishing, by the one or more servers, a connection to the application based receiving the selection of the identification information of the application; and
    transferring, by the one or more servers, traffic between the application and the user device after establishing the connection.

2. The method of claim 1, where the information identifying the user device includes a telephone number associated with the user device, and
    where the method further comprises:
        obtaining, using the telephone number, the identifiers of the applications and the identifier of the gateway device,
            the gateway device being located in the customer home network.

3. The method of claim 2, further comprising:
    retrieving, for a particular identifier in the identifiers of the applications, an application profile that includes information relating to a particular application, in the list of applications, with which the particular identifier is associated.

4. The method of claim 3, where the information relating to the particular application includes at least one of information relating to an Internet Protocol core protocol, a port number of the gateway device that the particular application uses, or information relating to a transport protocol.

5. The method of claim 1, where creating the list of applications includes:
    attempting to connect to each application of the applications;
    determining that a particular application, of the applications, is available when a connection can be established to the particular application; and
    including information identifying the particular application in the list of applications when the particular application is available.

6. The method of claim 1, where transferring the traffic between the application and the user device includes:
    converting, data from the application, from a first protocol to a second protocol.

7. The method of claim 1, where transferring the traffic between the application and the user device includes:
    converting, data from the application, from a first data format to a second data format.

8. The method of claim 1, where transferring the traffic between the application and the user device includes:
    transferring the traffic between the one or more servers and the user device over the Internet.

9. A server comprising:
    a memory to store instructions; and
    a processor to execute the instructions to:
        obtain, using information identifying a user device, an identifier of a gateway device from identifiers of a plurality of gateway devices, the identifiers of the plurality of gateway devices being stored in a data structure, obtain identifiers of applications associated with the identifier of the gateway device in the data structure, provide, based on the identifiers of the applications, a list of applications, available on a network device in a home network, to the user device, receive, from the user device, selection of information identifying an application in the list of applications, cause a connection, to the application, to be established based on receiving the selection of the information identifying the application, and transfer data between the application and the user device based on establishing the connection.

10. The server of claim 9, where, when transferring the data between the application and the user device, the processor is to execute the instructions to:

convert a first protocol, associated with the data, to a second protocol.

11. The server of claim 9, where, when transferring the data between the application and the user device, the processor is to execute the instructions to:

convert the data from a first format to a second format.

12. The server of claim 9, where the processor is further to execute the instructions to:

receive information identifying a path to a file on the network device and an electronic mail message address or a multimedia messaging service address, retrieve the file from the network device using the path, compose a message using the retrieved file, and submit the message, including the retrieved file, to a simple mail transfer protocol server for delivery to the received electronic mail message address or the multimedia messaging service address.

13. The server of claim 12, where the processor is to receive the electronic mail message address or the multimedia messaging service address and the path to the file from the user device.

14. The server of claim 9, where the processor is further to:

receive a session initiation request from the user device for access to the home network, where the session initiation request includes the information identifying the user device, where, when providing the list of applications, the processor is to:

provide the list of applications based on receiving the session initiation request.

15. The server of claim 9, where the processor is further to:

attempt to connect to a particular application of the applications, determine that the particular application is available when a connection, to the particular application, can be established, and include information identifying the particular application in the list of applications when the particular application is available.

16. The method of claim 1, further comprising:

receiving, from the user device, information identifying a path to a file on a device in the customer home network and an electronic mail message address or a multimedia messaging service address;

retrieving the file from the device using the path;

composing a message using the retrieved file; and submitting the message, including the retrieved file, to a simple mail transfer protocol server for delivery to the received electronic mail message address or the multimedia messaging service address.

17. A system comprising:

one or more servers to:

receive a request, from a user device, for access to a customer home network;

obtain, using information identifying the user device, an identifier of a gateway device from identifiers of a plurality of gateway devices, the identifiers of the plurality of gateway devices being stored in a data structure, obtain identifiers of applications associated with the identifier of the gateway device in the data structure, access, based on the identifiers of the applications, the customer home network to create a list of applications that are available on devices within the customer home network;

provide the list of applications to the user device;

receive, from the user device, selection of identification information of an application in the list of applications;

establish a connection to the application based on the received selection; and transfer data between the application and the user device after establishing the connection.

18. The system of claim 17, where the application is included in a device of the customer home network, and where, when transferring the data between the application and the user device, the one or more servers are to:

transfer a document, associated with the application, from the device to the user device.

19. The system of claim 17, where the one or more servers are further to:

receive, from the user device, information identifying a path to a file on a device in the customer home network and an electronic mail message address or a multimedia messaging service address, retrieve the file from the device using the path, compose a message using the retrieved file, and submit the message, including the retrieved file, to a simple mail transfer protocol server for delivery to the electronic mail message address or the multimedia messaging service address.

20. The system of claim 17, where, when transferring the data between the application and the user device, the one or more servers are to one of:

convert the data from a first protocol to a second protocol, or convert the data from a first data format to a second data format.

* * * * *